(12) United States Patent
Yeo et al.

(10) Patent No.: US 11,867,833 B2
(45) Date of Patent: Jan. 9, 2024

(54) CLASSIFICATION METHOD AND DEVICE

(71) Applicant: THE UNIVERSITY COURT OF THE UNIVERSITY OF ST ANDREWS, St Andrews (GB)

(72) Inventors: Hui Shyong Yeo, St. Andrews (GB); Aaron Quigley, St Andrews (GB); Gergely Flamich, St Andrews (GB); Patrick Schrempf, St Andrews (GB); David Harris-Birtill, St Andrews (GB)

(73) Assignee: THE UNIVERSITY COURT OF THE UNIVERSITY OF ST ANDREWS

( * ) Notice: Subject to any disclaimer, the term of this patent is extended or adjusted under 35 U.S.C. 154(b) by 417 days.

(21) Appl. No.: 16/490,338

(22) PCT Filed: Mar. 1, 2018

(86) PCT No.: PCT/GB2018/050529
§ 371 (c)(1),
(2) Date: Aug. 30, 2019

(87) PCT Pub. No.: WO2018/158578
PCT Pub. Date: Sep. 7, 2018

(65) Prior Publication Data
US 2019/0383902 A1 Dec. 19, 2019

Related U.S. Application Data

(60) Provisional application No. 62/552,833, filed on Aug. 31, 2017, provisional application No. 62/465,325, filed on Mar. 1, 2017.

(51) Int. Cl.
*G01S 7/41* (2006.01)
*G01F 23/284* (2006.01)
(Continued)

(52) U.S. Cl.
CPC ............ *G01S 7/412* (2013.01); *G01F 23/284* (2013.01); *G01N 22/00* (2013.01); *G01S 7/35* (2013.01); *G07D 11/50* (2019.01); *G01S 7/411* (2013.01)

(58) Field of Classification Search
CPC ......... G07D 11/50; G01S 7/411; G01S 7/412; G01S 7/35; G01N 22/00; G01F 23/284
See application file for complete search history.

(56) References Cited

U.S. PATENT DOCUMENTS 10,088,908 B1 * 10/2018 Poupyrev ............... G06V 40/28
10,222,469 B1 * 3/2019 Gillian .................... G06F 18/25
(Continued)

FOREIGN PATENT DOCUMENTS

DE 102012011165 A1 12/2013
WO 2007020763 A1 2/2007
(Continued)

OTHER PUBLICATIONS

International Search Report dated Jul. 1, 2018 in International Application No. PCT/GB2018/050529 filed Mar. 1, 2018.

*Primary Examiner* — Timothy A Brainard
*Assistant Examiner* — Ismaaeel A. Siddiquee
(74) *Attorney, Agent, or Firm* — Womble Bond Dickinson (US) LLP

(57) ABSTRACT

A classification method comprises positioning an object and a radar unit in proximity to each other; receiving by the radar unit radar signals reflected from the object; and classifying the object, wherein the classifying is based on the radar signals and/or at least one feature extracted from the radar signals, and the classifying of the object comprises determining classification data for the object.

23 Claims, 12 Drawing Sheets

(51) Int. Cl.
*G07D 11/50* (2019.01)
*G01S 7/35* (2006.01)
*G01N 22/00* (2006.01)

(56) References Cited

U.S. PATENT DOCUMENTS

| | | | | |
|---|---|---|---|---|
| 11,085,874 | B2* | 8/2021 | Pourkazemi | G01B 11/06 |
| 2005/0179584 | A1* | 8/2005 | Ohlsson | G01S 7/023 |
| | | | | 342/159 |
| 2014/0266860 | A1* | 9/2014 | Blumrosen | G01S 15/89 |
| | | | | 367/87 |
| 2016/0379462 | A1 | 12/2016 | Zack et al. | |
| 2017/0161987 | A1* | 6/2017 | Bulzacki | G07F 17/3241 |
| 2017/0328997 | A1* | 11/2017 | Silverstein | G01S 13/86 |
| 2018/0181789 | A1* | 6/2018 | Metzler | G06V 30/1916 |

FOREIGN PATENT DOCUMENTS

| | | |
|---|---|---|
| WO | 2013005083 A1 | 1/2013 |
| WO | 2013186559 A2 | 12/2013 |
| WO | 2016003475 A1 | 1/2016 |

* cited by examiner

CLASSIFICATION METHOD AND DEVICE

CROSS-REFERENCE TO RELATED APPLICATIONS

This application is a national phase application filed under 35 U.S.C. § 371 of International Application No. PCT/GB2018/050529, filed Mar. 1, 2018, which claims priority to, and the benefit of, Provisional Application No. 62/465,325, filed Mar. 1, 2017, and Provisional Application No. 62/552,833, filed Aug. 31, 2017.

FIELD

The present invention relates to a method and device for classification of objects using radar, for example for classification of materials by their material, shape, color, orientation and/or distance from a radar device.

BACKGROUND

Today we know more about our computing devices than they know about us, their environments, and their use. Existing visions of computing may assume knowledge of the world to realize their aims. For example, Weiser's vision of ubiquitous computing (Weiser, M. The computer for the 21st century, *SIGMOBILE Mob. Comput. Commun. Rev.* 3, 3 (July 1999), 3-11) relies on sensing distributed through the fabric of life to help enable context-aware interaction. Tangible user interfaces (Ishii, H., and Ullmer, B. Tangible bits: Towards seamless interfaces between people, bits and atoms. In *Proceedings of the ACM SIGCHI Conference on Human Factors in Computing Systems*, CHI '97, ACM (New York, NY, USA, 1997), 234-241) may rely on physical objects which may often need to understand their collective configurations while Instrumental Interaction (Beaudouin-Lafon, M. Instrumental interaction: An interaction model for designing post-wimp user interfaces. In *Proceedings of the SIGCHI Conference on Human Factors in Computing Systems*, CHI '00, ACM (New York, NY, USA, 2000), 446-453) may offer an interaction model for post-WIMP (Windows, Icons, Menus and Pointing) interfaces. Richer sensing and understanding of the real world may allow new forms and styles of interaction, and hence entirely new classes of user interface to emerge.

It is known to use radar for sensing. Radar uses an emission of electromagnetic radio waves, for example with a frequency within 1 GHz-300 GHz, which is then reflected back from an object and received by a detector. The time of flight may be used to calculate the distance to an object, and using the Doppler shift the velocity of the object may also be measured.

Properties which may affect the received radar intensity from an object may include, for example, the absorption and scattering properties of a material of the object at the wavelengths used, and hence the reflection and transmission properties of the material, the material's thickness and shape, the refractive index and hence the specular reflection from the material, and/or the distance to the object from the emitter/receiver.

The received signal may have contributions from reflection from the bottom surface of the object, scattering from the internal structure of the object, and reflection from the rear surface of the material. Several physical properties of the material, such as the density, may affect these absorption and scattering coefficients, a review of which may be found, for example, at pages 3 to 40 of Jol, H. M. *Ground penetrating radar theory and applications*, Elsevier, 2008. Objects may comprise a single material (e.g., copper sheet) or composite materials (e.g., a mobile phone composed of a combination of materials such as glass, aluminium, plastics etc.) and may have different received radar signals due to their physical properties.

It is known to use sensing for material and object classification. Our research, and hence our user studies, draw on three different bodies of research, including object recognition, material classification and approaches in context aware computing.

Object recognition may be achieved by sampling an object in destructive or non-destructive ways, or disruptive or non-disruptive ways. Destructive methods may involve taking a physical sample of the object and subjecting it to chemical analysis, for example with different types of chromatography or spectroscopy. The use of chemical analysis may rely on the object comprising a single material, or on sampling sufficient aspects of composite materials to recognize the overall object. Methods which involve localised destruction (e.g., etching) are also possible, for example to realize acoustic barcodes.

Non-disruptive and non-destructive approaches rely on sensing the object from its real world use. Computer vision techniques, which may require the object to be visible, well lit and within range for a suitable resolution, have been explored in a range of object tracking approaches (e.g., tracking rectangular objects such as tablets), while depth sensing (for example, Kinect) with infrared can overcome the issue of lighting. Radar systems have been used to recognize particular types of aircraft or materials in luggage or body scanners. Ground-penetrating radar (GPR) may be used to detect buried objects such as utility pipes or bones. Object tracking systems which rely on measuring WiFi or Bluetooth signals may also be employed to recognize objects.

Disruptive yet largely non-destructive approaches may employ the addition of elements to the object which can be sensed (e.g., RFID, visual markers, QR codes) or by allowing the objects to emit visual or audio signals (e.g., ultrasonic).

In practice, both destructive and disruptive object recognition approaches may have a significant impact and hence real world disruption on the physical infrastructure, environment, computational system or services offered.

Destructive methods of object identification may also be employed for material classification. Further non-destructive methods such as near-infrared (NIR) spectroscopy may often be utilized for analyzing pharmaceutical products. Likewise, millimeter wave and terahertz technology may be used to detect materials from a distance for scientific exploration (e.g., planet hunting) or security purposes. By re-purposing an off-the-shelf radio chipset, Zhu et al. (Zhu, Y., Zhu, Y., Zhao, B. Y., and Zheng, H. Reusing 60 ghz radios for mobile radar imaging, In *Proceedings of the 21st Annual International Conference on Mobile Computing and Networking*, MobiCom '15, ACM (New York, NY, USA, 2015), 103-116) have used radar to recognize materials from a distance based on a database of material/radar signal loss from different distance and incident angle. InfraStructs (Willis, K. D. D., and Wilson, A. D. Infrastructs: Fabricating information inside physical objects for imaging in the terahertz region. *ACM Trans. Graph.* 32, 4 (July 2013), 138:1-138:10) suggest future applications for interaction, using terahertz imaging. Research into object detection and material recognition has been undertaken on buried objects with GPR images. Regardless of the approach, these sensing methods may be complex and costly, let alone the size and power requirements.

As with recognition, material classification may employ nondestructive and less disruptive vision-based approaches, although this can be challenging. However, in a controlled setup with sufficient light or self-illumination and at a close proximity, material classification may be more tractable. Harrison and Hudson (Harrison, C., and Hudson, S. E. Lightweight material detection for placement-aware mobile computing. In *Proceedings of the 21st Annual ACM Symposium on User Interface Software and Technology*, UIST '08, ACM (New York, NY, USA, 2008), 279-282), employ a single photoresistor with multispectral illumination to identify the surface material property. Similar image-based surface classification techniques exist, such as using a laser optical mouse sensor for classification. More recent work in SpecTrans (Sato, M., Yoshida, S., Olwal, A., Shi, B., Hiyama, A., Tanikawa, T., Hirose, M., and Raskar, R. Spectrans: Versatile material classification for interaction with textureless, specular and transparent surfaces. In *Proceedings of the 33rd Annual ACM Conference on Human Factors in Computing Systems*, CHI '15, ACM (New York, NY, USA, 2015), 2191-2200) is able to classify transparent materials in addition to surface material of everyday objects but does not report on different object states (e.g., filled/non-filled cup) or use with different body parts.

Vision based material classification may suffer from being limited to material qualities which are present on the surface of the object. This may result in confusion where a layer of opaque material (packaging) blocks the primary object of interest for classification.

The placement of a device on the body or within the environment can be seen as an aspect of context recognition. As such, existing wearable approaches suggest that material recognition to enable placement detection may be valuable to both location and activity recognition. Phoneprioception (Wiese, J., Saponas, T. S., and Brush, A. B. Phoneprioception: Enabling mobile phones to infer where they are kept. In *Proceedings of the SIGCHI Conference on Human Factors in Computing Systems*, CHI '13, ACM (New York, NY, USA, 2013), 2157-2166) further strengthens this by suggesting that simple sensors such as an accelerometer and light sensor may be combined to achieve high accuracy in determining a phone placement location, both on body and within one's personal space. Using an EMG (electromyography) sensor, Botential (Matthies, D. J. C., Perrault, S. T., Urban, B., and Zhao, S. Botential: Localizing on-body gestures by measuring electrical signatures on the human skin. In *Proceedings of the 17th International Conference on Human-Computer Interaction with Mobile Devices and Services*, MobileHCI '15, ACM (New York, NY, USA, 2015), 207-216) is able to detect different placements on the human body. On the other hand, Lien et al. (Lien, J., Gillian, N., Karagozler, M. E., Amihood, P., Schwesig, C., Olson, E., Raja, H., and Poupyrev, I. Soli: Ubiquitous gesture sensing with millimeter wave radar. *ACM Trans. Graph.* 35, 4 (July 2016), 142:1-142:19) and Song et al. (Song, J., Wang, S., Lien, J., Poupyrev, I., and Hilliges, O. Interacting with soli: Exploring fine-grained dynamic gesture recognition in the radio-frequency spectrum. In *Proceedings of the 29th Annual ACM Symposium on User Interface Software and Technology*, UIST '16, ACM (New York, NY, USA, 2016)) introduce a new approach to sensing finger gestures, with an end-to-end radar system (Soli) and classify the gestures using machine learning techniques such as random forest and deep neural network.

New forms of sensing may allow a wider range of controllers, physical interactions, devices and input techniques to form part of our interactions with computational systems. In this context, tangible interaction may allow users to directly manipulate digital content and control of computation with physical artefacts. Such physical manipulations may allow people to quickly familiarize themselves with new technologies and to achieve a level of expressiveness which may be proportional to their dexterity in handling such physical controllers. Experience suggests that such interaction may be perceived to be intuitive by most users. This has motivated researchers to study applications of tangible controllers for education, musical expressiveness, input devices and data manipulation. However, behind the simplicity of direct manipulation of physical controllers, we find complex tracking technologies and infrastructures may often be required in order to accurately determine which controllers are used and their motions. To achieve such tracking, common techniques include the use of cameras, capacitive sensing, fiducial markers, sound, magnets and tags (e.g., RFID).

Such techniques may rely on optical tracking, or may require modifications of the physical objects as described above. Optical tracking may rely on optical sensors or cameras and therefore may suffer from visual occlusions and constraints on lighting conditions. It may also be technically complex to identify multiple objects and their manipulations using only visual data, based solely on the object's shape. Accordingly, many tangible systems include other mechanisms for inferring the identity of multiple objects simultaneously, while employing computer vision methods for tracking motions and user interactions. Alternative approaches have employed different types of sensors or tagging systems for recognizing objects, but many of these methods either may not work with passive objects or may require modifications of the object to be tracked (e.g., attaching a tag or a sensor to the object or near it). Such problems may hinder the usability of tangible systems and limit their widespread deployment.

Several systems have been proposed for identifying and tracking both passive and active (powered) tokens. Perhaps the most common method of identification and tracking is that of optical sensing. Avrahami et al. (Daniel Avrahami, Jacob O. Wobbrock, and Shahram Izadi. 2011. Portico: Tangible Interaction on and Around a Tablet. In *Proceedings of the 24th Annual ACM Symposium on User Interface Software and Technology* (UIST '11). ACM, New York, NY, USA, 347-356) describe a system that uses two cameras to visually track arbitrary objects positioned above and around a display. The two cameras help to minimize the visual occlusion during tracking.

Similarly, iCon (Kai-Yin Cheng, Rong-Hao Liang, Bing-Yu Chen, Rung-Huei Laing, and Sy-Yen Kuo. 2010. iCon: Utilizing Everyday Objects As Additional, Auxiliary and Instant Tabletop Controllers. In Proceedings of the *SIGCHI Conference on Human Factors in Computing Systems* (CHI '10). ACM, New York, NY, USA, 1155-1164) employs everyday passive objects augmented with visual markers to enable various interactions with a tabletop, while Lumino (Patrick Baudisch, Torsten Becker, and Frederik Rudeck. 2010. Lumino: Tangible Blocks for Tabletop Computers Based on Glass Fiber Bundles. In *Proceedings of the SIGCHI Conference on Human Factors in Computing Systems* (CHI '10). ACM, New York, NY, USA, 1165-1174), reacTIVision (Martin Kaltenbrunner and Ross Bencina. 2007. reacTIVision: A Computer-vision Framework for Table-based Tangible Interaction. In *Proceedings of the 1st*

International Conference on Tangible and Embedded Interaction (TEI '07). ACM, New York, NY, USA, 69-74) and reacTable (Sergi Jordá, Günter Geiger, Marcos Alonso, and Martin Kaltenbrunner. 2007. The reacTable: Exploring the Synergy Between Live Music Performance and Tabletop Tangible Interfaces. In *Proceedings of the 1st International Conference on Tangible and Embedded Interaction* (TEI '07). ACM, New York, NY, USA, 139-146) use tracking of markers to extend the interaction with tangible objects placed on a tabletop device.

Lumino allows multiple objects to be stacked in order to achieve more complex interactions based on multiple tokens which are tracked simultaneously. Visual markers may also be substituted by RFID tags, which allows for the recognition of different tagged objects and motions undertaken with them.

The widespread adoption of tablet devices has fostered research and commercial efforts (e.g., Disney appMATes) for tracking objects near or around these devices. Popular techniques include using conductive material and the capacitive screen, magnetic sensors, sound and motion sensors. For example, CapStones and ZebraWidget (Liwei Chan, Stefanie Müller, Anne Roudaut, and Patrick Baudisch. 2012. CapStones and ZebraWidgets: Sensing Stacks of Building Blocks, Dials and Sliders on Capacitive Touch Screens. In *Proceedings of the SIGCHI Conference on Human Factors in Computing Systems* (CHI '12). ACM, New York, NY, USA, 2189-2192) are examples of stackable blocks and widgets with a system of wires and connectors inside that, once placed on a capacitive screen, allows the device underneath to discern the blocks identity.

This idea was then generalized in Capricate (Martin Schmitz, Mohammadreza Khalilbeigi, Matthias Balwierz, Roman Lissermann, Max Mühlhäuser, and Jürgen Steimle. 2015. Capricate: A Fabrication Pipeline to Design and 3D Print Capacitive Touch Sensors for Interactive Objects. In *Proceedings of the 28th Annual ACM Symposium on User Interface Software and Technology* (UIST '15). ACM, New York, NY, USA, 253-258), showing a method for 3D printing embedded pieces with capacitive parts.

An alternative approach uses magnetic sensing. GaussBits (Rong-Hao Liang, Kai-Yin Cheng, Liwei Chan, Chuan-Xhyuan Peng, Mike Y. Chen, Rung-Huei Liang, De-Nian Yang, and Bing-Yu Chen. 2013. GaussBits: Magnetic Tangible Bits for Portable and Occlusion-free Near-surface Interactions. In *Proceedings of the SIGCHI Conference on Human Factors in Computing Systems* (CHI '13). ACM, New York, NY, USA, 1391-1400) comprises an array of hall-effect sensors placed underneath a tablet device and used for simultaneous tracking of multiple magnetic objects on-screen.

GaussRFID (Rong-Hao Liang, Han-Chih Kuo, and Bing-Yu Chen. 2016. GaussRFID: Reinventing Physical Toys Using Magnetic RFID Development Kits. In Proceedings of the 2016 *CHI Conference on Human Factors in Computing Systems* (CHI '16). ACM, New York, NY, USA, 4233-4237) combines magnetic sensing with RFID and GaussToys (Rong-Hao Liang, Han-Chih Kuo, and Bing-Yu Chen. 2015. GaussStarter: Prototyping Analog Hall-Sensor Grids with Breadboards. In *Adjunct Proceedings of the 28th Annual ACM Symposium on User Interface Software and Technology* (UIST '15 Adjunct). ACM, New York, NY, USA, 49-50) extends this to support various interactions.

MagGetz (Sungjae Hwang, Myungwook Ahn, and Kwang-yun Wohn. 2013. MagGetz: Customizable Passive Tangible Controllers on and Around Conventional Mobile Devices. In *Proceedings of the 26th Annual ACM Symposium on User Interface Software and Technology* (UIST '13). ACM, New York, NY, USA, 411-416) and MagnID (Andrea Bianchi and Ian Oakley. 2015. MagnID: Tracking Multiple Magnetic Tokens. In *Proceedings of the Ninth International Conference on Tangible, Embedded, and Embodied Interaction* (TEI '15). ACM, New York, NY, USA, 61-68) extend the interaction by allowing tracking of objects around the device in fixed or arbitrary locations. Sound and motion sensing may also be used to turn passive objects into multifunctional input devices or enable motion grip sensing of active and wirelessly connected tokens.

With minimal tagging, RapID (Andrew Spielberg, Alanson Sample, Scott E. Hudson, Jennifer Mankoff, and James McCann. 2016. RapID: A Framework for Fabricating Low-Latency Interactive Objects with RFID Tags. In *Proceedings of the 2016 CHI Conference on Human Factors in Computing Systems* (CHI '16). ACM, New York, NY, USA, 5897-5908) turns objects into interactive elements.

There are several approaches which rely on simple add-on modules to augment the sensing capabilities of their underlying systems. For example, Osmo (https://www.playosmo.com) is a simple mirror like module that can be attached to the front camera of a mobile device. With the mirror to guide the front camera, pairing with its companion software, it's able to track various pieces that come with the package, allowing tangible interaction.

Acoustruments (Gierad Laput, Eric Brockmeyer, Scott E. Hudson, and Chris Harrison. 2015. Acoustruments: Passive, Acoustically-Driven, Interactive Controls for Handheld Devices. In *Proceedings of the 33rd Annual ACM Conference on Human Factors in Computing Systems* (CHI '15). ACM, New York, NY, USA, 2161-2170) comprise primitive blocks that guide the acoustic pathway between the speaker and the microphone of a mobile device. By alternating the pathway such as with holes or cavities, it's possible to sense various kinds of interaction. Sauron (Valkyrie Savage, Colin Chang, and Björn Hartmann. 2013. Sauron: Embedded Single-camera Sensing of Printed Physical User Interfaces. In Proceedings of the 26th Annual ACM Symposium on User Interface Software and Technology (UIST '13). ACM, New York, NY, USA, 447-456) augments a camera with a 3D printed case that enclosed it, for sensing human input on physical controls, such as buttons, sliders and joystick.

Finally, object identification or internal structure determination methods might form the basis for other classes of tangible interaction. SpecTrans relies on a material's optical properties along with the illumination from laser and multi-directional, multi-spectral LEDs to extract optical features of textureless, specular and transparent surfaces. Infrastructs are material based tags that embed information in the way inner layers are constructed. Using a Terahertz imaging system, a 3D map of inner layers may be reconstructed and decoded to reveal the objects identity. However, at least some of the techniques described above may not be able to track the location of different objects and may only be used for identification.

SUMMARY

In a first aspect, there is provided a classification method comprising: positioning an object and a radar unit in proximity to each other; receiving by the radar unit radar signals reflected from the object; and classifying the object, wherein the classifying is based on the radar signals and/or at least one feature extracted from the radar signals.

The method may be used in providing a small, versatile radar-based system for object classification. Object classification may include, for example, classification of objects by material; by shape; by color (for example, color due to dye use); by orientation; and/or by position, for example by distance.

The method may enable computing devices to recognize proximate objects, for example to recognize the materials of proximate objects. The method may enable computing devices to recognize non-proximate objects. The different radar characteristics of different objects may be used in classification.

The method may provide a method of classification that is non-disruptive and non-destructive. The method may not require the object to be illuminated. The method may be able to classify objects even when they are not visible. The method may be able to classify objects even when they are packaged or otherwise obscured.

The classifying may be performed by using a procedure for classifying, for example a machine learning classifier. The classifying may be performed using a machine learning classifier. The procedure for classifying may comprise or use at least one of a random forest classifier, a deep neural network classifier, a support vector machine (SVM) classifier, template matching, programmatic rules, lookup heuristics.

Positioning the object and the radar unit in proximity to each other may comprise positioning the object near to the radar unit, or positioning the radar unit near to the object.

Positioning the object and the radar unit in proximity to each other may comprise positioning the object in a measurement region associated with the radar unit. Positioning the object and the radar unit in proximity to each other may comprise positioning the object at a distance from the radar unit that is less than 10 m, optionally less than 1 m, further optionally less than 100 mm, further optionally less than 50 mm, further optionally less than 20 mm. Positioning the object and the radar unit in proximity to each other may comprise positioning the object in physical contact with the radar unit.

The radar unit may comprise or be associated with a measurement platform. Positioning the object and the radar unit in proximity to each other may comprise placing the object in contact with the measurement platform. The radar unit may comprise or be associated with a housing. Positioning the object and the radar unit in proximity to each other may comprise placing the object in contact with the housing, for example in contact with one surface of the housing.

The measurement platform may comprise a guide that is configured to indicate a plurality of positions for the object. For example, the guide may comprise a plurality of apertures or indicators. The object may comprise a body part, for example a finger. The object may comprise a pointer, for example a stylus. A user may use the guide to position the object at a desired position relative to the radar unit.

The measurement platform may comprise at least one of a case, a module. The radar unit may comprise or be associated with a case. The case may be configured to at least partially surround the radar unit. The radar unit may comprise or be associated with a module. The module may comprise a holder configured to hold the object.

The module may be detachably coupled to the case. There may be provided a plurality of modules, each of which is configured to be detachably coupled to the same case.

The case and/or holder may comprise at least one aperture configured to receive the object. The measurement platform may comprise a plurality of apertures, wherein each aperture is configured to receive the object, or wherein each aperture is configured to receive a respective one of a plurality of objects. The plurality of apertures may comprise a plurality of slots.

Each aperture may be configured to hold the object, or one of the plurality of objects, at a different position relative to the radar unit. Each aperture may be configured to hold the object, or one of the plurality of objects, at a different distance from the radar unit.

The case and/or module may assist a user to position the object in a desired position. By using the case and/or module, the object may be positioned in a repeatable position or positions with respect to the radar unit. The use of a case and/or module to guide the position of the object may result in improved accuracy.

Each of the object and the radar unit may remain static while the radar signals are received.

The radar unit may comprise or form part of a mobile device, for example a mobile phone. A length of the radar unit may be less than 100 mm, optionally less than 50 mm, further optionally less than 10 mm. A width of the radar unit may be less than 100 mm, optionally less than 50 mm, further optionally less than 10 mm. A height of the radar unit may be less than 100 mm, optionally less than 50 mm, further optionally less than 10 mm. The radar unit may be smaller than some conventional radar systems.

By including the radar unit in a mobile device, a classification device may be provided that is portable and easy to use. For example, the radar unit may be included in a mobile phone or smartwatch or wearable unit, thereby enhancing the functionality of that mobile device and allowing the mobile device to be used to classify objects.

The radar unit may comprise at least one transmitter configured to transmit radar signals. The radar signals may comprise FMCW (frequency modulated continuous wave) signals. The FMCW signals may repeat at a radar repetition frequency, for example a radar repetition frequency between 1 kHz and 10 kHz. Each of the radar signals transmitted by the at least one transmitter may comprise at least one frequency sweep.

The at least one transmitter may comprise at least two transmitters, optionally at least three transmitters, further optionally at least four transmitters. The at least one transmitter may be positioned inside the or a housing that is part of or is associated with the radar unit.

The radar unit may comprise at least one receiver configured to receive the radar signals reflected from the object. The radar signals reflected from the object and received by the radar unit may comprise radar signals that have been transmitted by the at least one transmitter. The radar signals may comprise FMCW signals. The radar signals may comprise signals that are swept in frequency.

The at least one receiver may comprise at least two receivers, optionally at least three receivers, further optionally at least four receivers. The at least one receiver may comprise an array of receivers, for example a 2×2 array of receivers or 3×3 array of receivers.

Positioning the object and the radar unit in proximity to each other may comprise positioning the object at a distance from the at least one transmitter and/or from the at least one receiver that is less than 100 mm, optionally less than 50 mm, further optionally less than 20 mm.

The at least one transmitter and/or at least one receiver may be integrated on a chip.

The radar signals may comprise signals having wavelengths between 1 GHz and 100 GHz, optionally between 40 GHz and 80 GHz, further optionally between 50 GHz and 70 GHz. The radar signals may comprise signals having a range of wavelengths that is centered on 60 GHz. The radar signals may comprise signals in a 57 GHz to 64 GHz band.

The radar signals received by the radar unit may comprise signals on a plurality of channels. For example, different channels may comprise signals received by different ones of the plurality of receivers.

The at least one feature extracted from the radar signals may comprise data from the received radar signals, for example amplitude data. The at least one feature extracted from the radar signals may comprise an amplitude for each of a plurality of data bins. The at least one feature extracted from the radar signals may comprise an amplitude for each of a plurality of frequencies.

The at least one feature extracted from the radar signals may comprise at least one statistical feature, for example at least one of an average value, an absolute value, a root mean square, a global maximum, a global minimum. The at least one feature extracted from the radar signals may comprise at least one average and/or absolute value for a plurality of channels.

The classifying of the object using the procedure for classifying may comprise using the procedure for classifying to determine a classification of the object. The classifying of the object using the procedure for classifying may comprise determining classification data for the object. The classification data may comprise probability data.

The procedure for classifying may be configured to determine a position of the object relative to the radar unit. The procedure for classifying may be configured determine the position of the object repeatedly, for example at regular time intervals. The procedure for classifying may be configured to determine a change in the position of the object over time, for example to identify a relative sliding motion of the object and the radar unit or a relative rotation of the object and the radar unit.

The procedure for classifying may be configured to determine a distance of the object from the radar unit.

The procedure for classifying may be configured to distinguish between different objects. The procedure for classifying may be configured to distinguish between different classes of object, for example between classes of objects having different materials. For example, one class of objects may comprise wooden objects and another class of objects may comprise metal objects. Each class of object may comprise a different type or category of object. For example, one class of objects may comprise mugs, and another class of objects may comprise mousepads.

The procedure for classifying may be configured to distinguish between objects or classes of objects having different shapes. The objects or classes of objects may have the same or similar materials.

The procedure for classifying may be configured to distinguish between objects or classes of objects having different internal structure. For example, the procedure for classifying may be configured to distinguish between objects with or without holes, or having a different shape, size or number of holes.

The procedure for classifying may be configured to distinguish between objects or classes of objects having different surface properties. For example, the procedure for classifying may be configured to distinguish between objects having different textures or bumps. The procedure for classifying may be configured to distinguish between objects having different coatings.

The procedure for classifying may be configured to distinguish between an object in a first orientation and that object in a second orientation. For example, the procedure for classifying may be configured to distinguish whether the object is facing up or facing down.

The procedure for classifying may be configured to distinguish between a predetermined list of objects or classes of objects. The classification data may comprise, for each of the predetermined list of objects, a respective probability that the object is that object. The classification data may comprise, for each of the predetermined list of classes of object, a respective probability that the object belongs to that class of objects.

The classification data may comprise a selection of one of more of the list of objects or classes of objects. The selection may comprise the object or class of object from the predetermined list of objects that has the highest probability.

The method may further comprise displaying at least some of the classification data, for example displaying the at least some of the classification data on a display screen.

The different objects and/or classes of object may comprise objects having at least one of: different materials, different sizes, different thicknesses, different geometry, different colors, different orientations. The different objects and/or classes of objects may comprise objects having different materials and/or combinations of materials. At least some of the objects may comprise composite materials. The different objects and/or classes of objects may comprise objects having different surface textures and/or different internal structure.

The classifying of the object may be performed in real time.

The classifying of the object may comprise determining classification data for the object. The method may further comprise providing to a user information about the object based on the classification data. For example, the information about the object may comprise a name of the object. The information about the object may comprise at least one of dictionary data, foreign language data, a technical specification. The information about the object may comprise information identifying the object. The information about the object may comprise information about at least one material or component of the object. The information about the object may be obtained locally, for example in the same device in which the procedure for classifying is implemented, or may be obtained remotely, for example via the internet.

Providing information about the object in response to the classifying of the object may provide a convenient way for a user to find out about an object. For example, a language learner (whether child or adult) may be able to find out a name of an object in a desired language by introducing the object to the radar unit or vice versa. A visually impaired person may be able to find out information about an object using this method that they cannot find out visually.

The method may further comprise determining based on the classification data an operating mode of a computer program or device. The method may further comprise determining based on the classification data an input to a computer program or device, for example a command.

The classification data may comprise a movement of the object. The moving object may be used as an input device. For example, a sliding object may be used as a sliding control, or a rotating object may be used as a rotating control.

The classification data may comprise a position and/or orientation of the object. Different inputs may be provided to the computer program based on different positions and/or orientation of the object. For example, flipping the object may provide a binary control where each side of the object is associated with a different interaction.

The positioning of the object and the radar unit in proximity to each other may comprise positioning the radar unit in proximity to one of a predetermined set of objects, wherein each object of the predetermined set of objects corresponds to a different operating mode of the computer program. For example, the computer program may be a painting and/or photo editing application, and the determining of the operating mode may comprise determining the use of scale, rotate or pan, or determining a size, shape or color of brush.

The different objects and/or classes of objects may comprise different body parts, for example different parts of the human body. The different objects and/or classes of objects may comprise clothed and/or unclothed body parts.

The operating modes of the computing program or device may comprise, for example, modes suitable for use with a gloved hand and with an ungloved hand.

The classification data may comprise an identification of a body part. The determining of an input based on the classification data may comprise determining different commands in dependence on which body part is identified. For example, touching different body parts with the radar unit may activate different commands. Touching the back of the hand with the radar unit may be used to launch a clock application. Touching the stomach with the radar unit may be used to launch a food application. Touching the leg with the radar unit may be used to launch a map application.

The classification data may comprise an identification of an individual user. For example, the classification data may comprise an identification of a hand of a user.

The classification data may comprise an identification of a liquid. The classification data may comprise a nutrition level.

The method may further comprise determining based on the classification data a location of the radar unit, for example whether the radar unit is on a table, on a sofa, or in a pocket. The method may further comprise determining based on the classification data an orientation of the radar unit, for example whether the radar unit is face up or face down.

The method may further comprise determining based on the classification data a movement of the radar unit. The method may further comprise tracking the radar unit based on the classification data.

The radar unit may comprise or form part of a mobile phone. The determining of an operating mode based on the classification data may comprise determining a different operating mode for the mobile phone in dependence on the classification data. For example, the mobile phone may be switched into silent mode or into loudspeaker mode depending on its determined location.

The different objects and/or classes of object may comprise receptacles having different fill levels. The procedure for classifying may be trained to distinguish between different fill levels, for example between an empty receptacle, a half full receptacle, a full receptacle. The receptacles may have different fill levels of a fluid. The receptacles may have different fill levels of a granular material, for example sand. The procedure for classifying may be configured to distinguish between different states of an hourglass.

The radar unit may form part of an appliance, for example a household appliance. The appliance may be an appliance into which objects are placed. For example, the radar unit may form part of a fridge, washing machine, dryer, cooker, oven, microwave oven, grill, blender, or food processor. The object may comprise an item stored in the appliance, for example a food or drink item. The classifying of the object may comprise classifying the object as a type of food or drink. The object may comprise a receptacle placed in the appliance, for example a receptacle for liquids.

The classification data may comprise fill level data. The method may further comprise providing a notification to a user based on the classification data. For example, the user may be notified when the fill level is below a threshold level and/or the fill level is empty. The user may be notified when the fill level is above a threshold level and/or the fill level is full. For example, fill level may be used in a fridge to notify a user when to reorder liquids (for example, milk). Fill level data may be used, for example, in a restaurant to determine when to refill drinks.

The method may further comprise performing an action based on the classification data, for example automatically refilling a receptacle if its fill level is low, or automatically ordering more milk.

The classes of object may comprise types of waste, for example metal, glass and wood. The method may be used to separate different materials for recycling.

The radar unit may be embedded in clothing or footwear. The information about the object may comprise assistive data, for example assistive data for visually impaired persons. The information about the object may provide information about an environment of a user. For example, the radar unit may be embedded in footwear. The object may be a surface on which a user is standing or walking.

The radar unit may comprise or form part of a digital medical device, for example a thermometer or stethoscope. The classification data may comprise a classification of a body part being measured by the digital medical device. Medical data obtained by the digital medical device may be automatically tagged with the classification data.

The radar unit may be embedded in a surface, for example in a shelf, tray or production line. The procedure for classifying may be used to classify objects placed on that surface. The radar unit may be embedded in a glove. The procedure for classifying may be used to classify objects held using that glove.

In a further aspect, there is provided a method for training a procedure for classifying objects or classes of objects, the method comprising: obtaining training data for each of a plurality of different objects or classes of objects, wherein the training data for each object or class of objects comprises radar signals reflected from that object or from objects in that class of objects and/or at least one feature extracted from the radar signals; and training a procedure for classifying on the training data.

The procedure for classifying may comprise a machine learning classifier. The procedure for classifying may comprise at least one of a random forest classifier, a deep neural network classifier, a support vector machine (SVM) classifier, template matching, programmatic rules, lookup heuristics.

The training data for an object may be obtained by positioning the object or objects in the class of objects in proximity to a radar unit and receiving by the radar unit radar signals reflected from the object or from objects in the class of objects. The training data for the object may comprise data obtained from multiple iterations of a process of positioning the object or objects from the class of objects in proximity to the radar unit and receiving by the radar unit radar signals reflected from the object. The or each object may be positioned at different distances from the radar unit and/or at different orientations relative to the radar unit.

In a further aspect, there is provided an apparatus for classification of objects, the apparatus comprising a radar unit configured to receive radar signals reflected from an object positioned in proximity to the radar unit, and a processor configured to classify the object based on the radar signals and/or at least one feature extracted from the radar signals.

The apparatus may further comprise a measurement platform. The measurement platform may comprise at least one of a case, a module. The case may at least partially surround the radar unit. The module may be detachably coupled to the case. The measurement platform may comprise at least one aperture configured to receive the object, or to receive one or more of a plurality of objects.

In another aspect, there is provided an apparatus for training a procedure for classifying objects or classes of objects, the apparatus comprising a processor configured to obtain training data for each of a plurality of different objects or classes of objects, wherein the training data for each object or class of objects comprises radar signals reflected from that object or from objects in that class of objects and/or at least one feature extracted from the radar signals; and to train a procedure for classifying on the training data.

The apparatus may further comprise a radar unit configured to receive radar signals reflected from each of the objects or from objects in each of the classes of objects when placed in the proximity of the radar unit.

In a further aspect, there is provided a method comprising: positioning a plurality of objects and a radar unit in proximity to each other; receiving by the radar unit radar signals reflected from plurality of objects; and classifying the plurality of objects, wherein the classifying is based on the radar signals and/or at least one feature extracted from the radar signals. The classifying may comprise counting the plurality of objects.

The radar unit may comprise or be associated with a measurement platform. The measurement platform may comprise at least one of a case, a module.

The positioning of the plurality of objects may comprise stacking the plurality of objects. Stacking the plurality of objects may comprise stacking the objects on top of the radar unit or measurement platform. Stacking the plurality of objects may comprise stacking the objects in, or guided by, an aperture or other feature of the measurement platform.

The stacking may be such that radar is reflected from each of the plurality of objects along a common axis. The common axis may be an axis along which the objects are stacked.

The plurality of objects may comprise a plurality of objects of the same type or category of object. For example, the plurality of objects may comprise a plurality of sheets of paper, a plurality of pages of a book, a plurality of banknotes, a plurality of playing cards, a plurality of poker sheets.

The classifying may comprise determining an order of the plurality of objects. For example, the classifying may distinguish between different orderings of the same objects.

The classifying may be performed by using a procedure for classifying, for example a machine learning classifier. The procedure for classifying may comprise or use at least one of a random forest classifier, a deep neural network classifier, a support vector machine (SVM) classifier, template matching, programmatic rules, lookup heuristics.

The classifying of the object using the procedure for classifying may comprise determining classification data for the object. The method may further comprise performing an action based on the classification data. The action performed may depend on a number of the objects, an ordering of the objects.

In a further aspect, there is provided an apparatus for classification of objects, the apparatus comprising a radar unit configured to receive radar signals reflected from a plurality of objects positioned in proximity to the radar unit, and a processor configured to classify the plurality of objects based on the radar signals and/or at least one feature extracted from the radar signals. Classifying the plurality of objects may comprise counting the plurality of objects. Classifying the plurality of objects may comprise determining an ordering of the plurality of objects. The plurality of objects may comprise a stack of objects.

In another aspect, there is provided an apparatus for training a procedure for classifying a plurality of objects, the apparatus comprising a processor configured to obtain training data for each of a plurality of different combinations of objects, wherein the training data for each combination of objects comprises radar signals reflected from that combination of objects in that class of objects and/or at least one feature extracted from the radar signals; and to train a procedure for classifying on the training data. Each combination of objects may comprise a different number of objects and/or a different ordering of objects.

There may be provided a household appliance comprising an apparatus as claimed or described herein. There may be provided a fridge comprising an apparatus as claimed or described herein.

There may be provided a mobile computing device comprising an apparatus as claimed or described herein. The mobile computing device may comprise at least one of a mobile phone, a smart watch, a wearable computing device.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

BRIEF DESCRIPTION OF THE DRAWINGS

Embodiments of the invention are now described, by way of non-limiting examples, and are illustrated in the following figures, in which:—

FIGS. 4A to 4E show 8-channels raw radar signals for different materials, while

FIGS. 6A to 6E show 8-channels raw radar signals for similar materials, while

FIG. 12a is a confusion matrix for ordering 3 coasters;

FIGS. 12b and 12c are confusion matrices for counting 5×20 colour chips;

FIG. 12d is a confusion matrix for counting 20 papers; and

FIGS. 12e and 12f are confusion matrices for identifying users.

DETAILED DESCRIPTION

Two prototypes are described below. The first prototype, RadarCat, is used to distinguish different materials using radar. The second prototype, Solinteraction, is used to demonstrate further modes of interaction including for example counting objects, ordering objects, and determining an object orientation.

Figure 1:
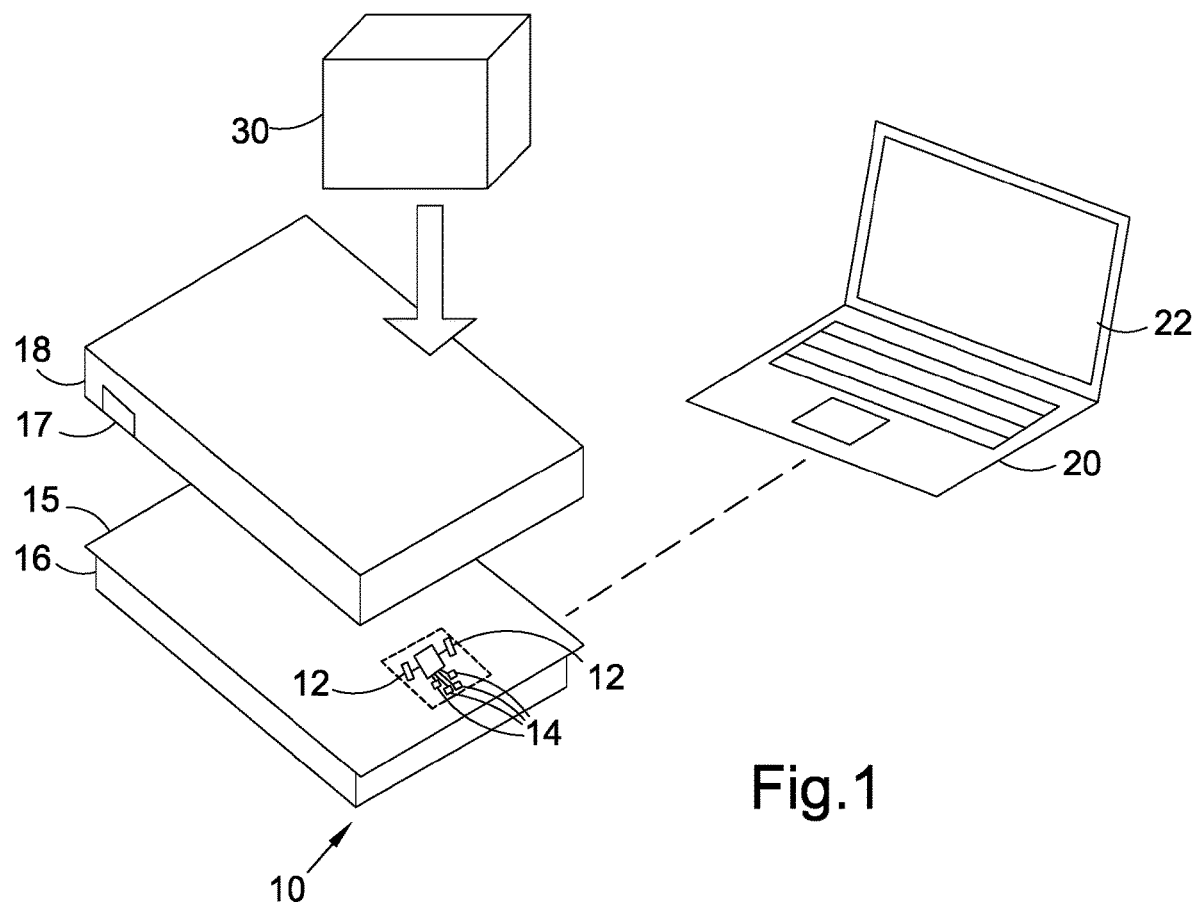
FIG. 1 is a schematic illustration of a system in accordance with an embodiment.

FIG. 1 is a schematic diagram of an apparatus in accordance with an embodiment. The apparatus may be referred to as RadarCat. The apparatus comprises a Soli radar unit 10 connected to a laptop computer 20. In other embodiments, the laptop computer 20 may be replaced or supplemented by any suitable computing apparatus, for example a PC, workstation, tablet, or mobile phone. The radar unit 10 may be replaced or supplemented by any suitable radar-emitting and/or radar receiving sensor or sensors.

Soli (Project Soli, https://www.google.com/atap/project-soli/) is a prototype radar device by Google ATAP, designed for capturing subtle finger motion for enabling interaction with computers. For detailed information, we refer the reader to the Soli paper, Lien, J., Gillian, N., Karagozler, M. E., Amihood, P., Schwesig, C., Olson, E., Raja, H., and Poupyrev, I. Soli: Ubiquitous gesture sensing with millimeter wave radar. *ACM Trans. Graph.* 35, 4 (July 2016), 142:1-142:19.

In other embodiments, techniques described below are applied to other small radar systems, for example Walabot (http://walabot.com), that will be available later in 2017.

FIG. 1 shows an exploded view of the Soli radar unit 10, which is not to scale. In the present embodiment, the Soli radar unit 10 comprises Soli alpha hardware. The Soli radar unit 10 is a monostatic radar device. The Soli radar unit 10 comprises multiple antennas (2 transmitters 12 and 4 receivers 14) which are shown in an enlarged section of FIG. 1. The transmitters 12 and receivers 14 are configured to provide simultaneous operation of up to 8-channels, using frequency modulated continuous wave (FMCW) operating in the 57 to 64 GHz range (center frequency of 60 GHz). In other embodiments, any suitable number of channels may be produced. Any number of transmitters 12 or receivers 14 may be used.

The transmitters 12 and receivers 14 form part of a PCB 15. The Soli radar unit 10 further comprises a heat sink 16, a USB port 17 and a housing 18, which may also be referred to as a shell or enclosure. The heat sink 16 is configured to remove heat from the PCB 15. The USB port 17 is configured to connect the Soli radar unit 10 to other devices. In the present embodiment, the laptop computer 20 is connected to the radar unit 10 via the USB port 17.

The distance from the top of the sensor comprising the transmitters 12 and receivers 14 to the top of the plastic enclosure 18 is 6 mm (FIG. 1).

On the laptop computer 20 is implemented a system in two parts i) a graphical user interface (GUI) in C++ using Qt and ii) a classifier backend in Java using Weka API (Hall, M., Frank, E., Holmes, G., Pfahringer, B., Reutemann, P., and Witten, I. H. The weka data mining software: An update. *SIGKDD Explor. Newsl.* 11, 1 (November 2009), 10-18).

Communication between the GUI and classifier is with sockets In the present embodiment, the classifier runs on the same machine as the GUI. In other embodiments, the classifier and the GUI may run on separate devices. For example, the classifier may be offloaded to a more powerful server via a network. Such a configuration may, for example, be suitable for scenarios involving wearable devices with limited computing resources. In further embodiments, the classifier may be replaced or supplemented by any suitable procedure for classifying objects, for example any suitable machine learning classifier, template matching, programmatic rules and/or lookup heuristics. Any suitable software may be used instead of or in addition to the Weka API, for example any suitable machine learning software.

Figure 2:
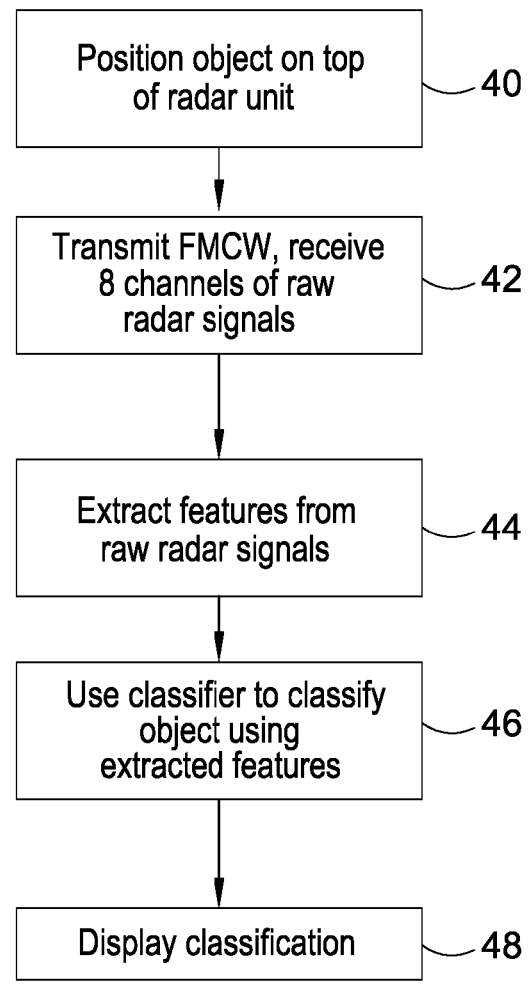
FIG. 2 is a flow chart of a method in accordance with an embodiment.

FIG. 2 is a flow chart illustrating in overview a method of an embodiment in which an object is placed on top of the sensor and raw radar signals are classified using machine learning (ML).

At stage 40 of the method of FIG. 2, an object 30 to be tested is placed on top of the enclosure 18. A distance from the sensor comprising the transmitters 12 and receivers 14 to a bottom surface of the object is therefore 6 mm. In the present embodiment, the object is static when placed on top of the enclosure 18.

In further embodiments, instead of the object 30 being placed on top of the enclosure 18 of the radar unit 10, a user positions the radar unit 10 such that the object is touched by the radar unit 10, for example as if using a stethoscope.

In other embodiments, the object 30 may be placed near to the radar unit 10 without coming into contact with the radar unit 10. For example, the object 30 may be placed within 10 mm, 50 mm or 100 mm, 1 m or 10 m of the radar unit. The object 30 may be placed into a measurement region extending outwards from the radar unit 10 by, for example, 100 mm, 200 mm, 1 m or 10 m.

Although in the present embodiment the object 30 is placed onto a housing of the radar unit 10 in other embodiments the object 30 may be placed on any suitable measurement platform, or held by any suitable holding apparatus. It has been observed that in some circumstances better results may be achieved when the object 30 and radar unit 10 are static than when one (or both) of the object 30 and radar unit 10 is moving.

At stage 42, the Soli radar unit 10 transmits an FMCW signal in the 57 to 64 GHz range. Part of the transmitted FMCW signal is reflected from the object 30. For example, part of the transmitted FMCW signal may be reflected from the bottom surface of the object 30, from an internal structure of the object 30 and/or from a far surface of the object 30.

The Soli radar unit 10 receives radar signals that are reflected from the object 30. In the present embodiment, 8 channels of radar signals are received by the Soli radar unit 10. The 8 channels are provided by permutations of the 2 transmitters and 4 receivers.

The received radar intensity is influenced by the reflection and transmission properties of the material. Reflected signals from many points both within and on the object surface are overlapping and hence contribute to the received signal.

The radar signals received by the Soli radar unit 10 may be described as raw radar signals. In the present embodiment, the raw signals are signals reported from the Soli radar unit 10 to the software implemented in the laptop computer. The raw signals are signals prior to software processing to extract or determine further measures or features. In other embodiments, the raw signals may undergo some preprocessing, for example noise reduction or filtering.

FIGS. 4A to 4E each show a set of 8 channels of raw radar signals. Each channel of the raw radar signals comprises amplitude values for each of 64 radar bins. The radar bins are binned in time. Over time, the frequency of the signal is scanned by FMCW such that each of the 64 radar bins corresponds to a different frequency.

At stage 44, the laptop computer 20 receives the raw radar signals from the radar unit 10. The laptop computer 20 processes the raw radar signals to extract a plurality of features.

In the present embodiment, the radar signals are considered to be stable and highly discriminative (as shown in FIGS. 4A to 4F and FIG. 6A to 6F). All 8 channels are used as input features. Each channel comprises 64 data points, yielding 512 features. We further extract the average (avg) and the absolute value (abs) along the signals from all 8 channels, yielding an additional 128 features. In addition, we extract common features such as absolute and root means square (rms) for each channel (x8); global maxima, global minima, avg, abs and rms for all channels (x1), yielding extra 21 features, resulting in a total of 661 features.

At stage 46, the laptop computer 20 uses the classifier to classify the object 30 by using the extracted features. The classifier is a machine learning classifier that has been trained in object classification as described below with reference to FIG. 3. In the embodiment of FIG. 2, the classifier is trained to distinguish between different materials. The classifier identifies a material from which the object is made by determining a probability that the object comprises each of a predetermined list of materials, and selecting the material from the list of materials for which the highest probability has been determined. In other embodiments, the classifier may be trained to distinguish between any suitable objects or classes of objects, further examples of which are provided below. In further embodiments, any suitable procedure for classifying may be used, which may or may not comprise a machine learning classifier.

At stage 48, the laptop computer 20 displays using the GUI a result of the classification performed in stage 46. In the present embodiment, the screen 22 of the laptop computer 20 displays the predetermined list of materials, and indicates for each of the possible materials the calculated probability that the object 30 is formed of that material. In other embodiments, any suitable display may be presented using the GUI. For example, the GUI may display only the single material that was determined to have the highest probability.

Figure 3:
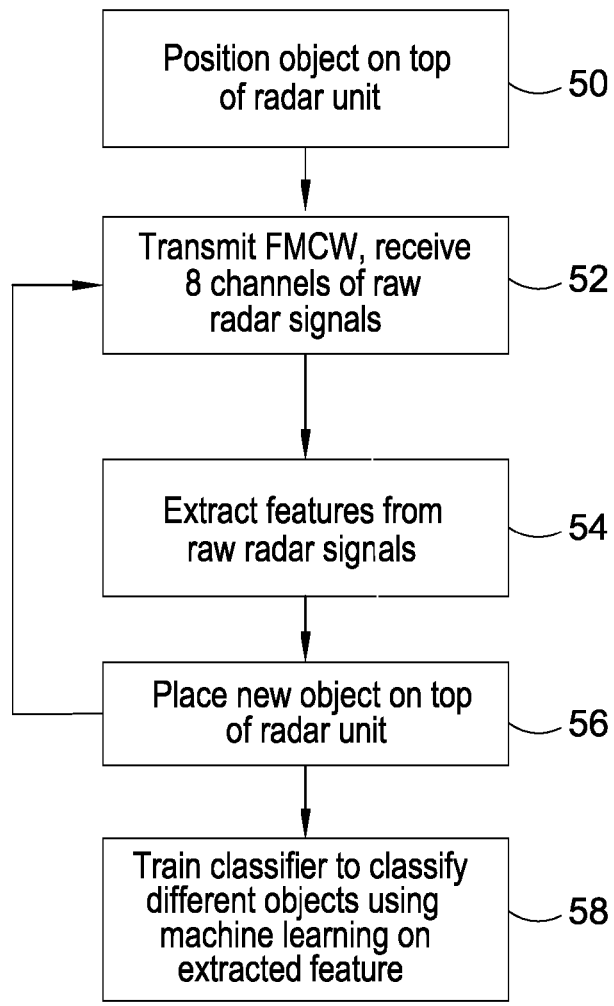
FIG. 3 is a flow chart of a training method in accordance with an embodiment.

FIG. 3 is a flow chart illustrating in overview a method of training a classifier in accordance with an embodiment, for example a method of training a classifier to be used in stage 46 of the process of FIG. 2.

In the embodiment of FIG. 3, the classifier is trained to distinguish between a predetermined list of materials, for example 10 different materials. In other embodiments, the classifier may be trained to distinguish between any suitable classes of objects, which may be referred to as types of object. In some embodiments, the classifier is trained to distinguish between specific individual objects.

Stages 50 to 54 of FIG. 3 correspond to stages 40 to 44 of FIG. 2. At stage 50, an object 30 to be used for training is placed on top of the enclosure 18. At stage 52, the Soli radar unit 10 transmits an FMCW signal in the 57 to 64 GHz range. The Soli radar unit 10 receives radar signals that are reflected from the object 30. At stage 54, the laptop computer 20 processes the raw radar signals to extract a plurality of features.

At stage 56 of FIG. 3, a new object comprising a different material from the first object 30 is placed on top of the radar unit 10. Stages 52 and 54 are then repeated for the new object. Stages 52 to 56 are repeated for further objects comprising further materials until features have been obtained for all the types of object. Each type of object may be positioned on the radar unit several times in order to obtain enough training data. Examples of the number of repetitions used in training are provided below.

Once features have been extracted for all types of object for as many repetitions as desired, the laptop computer 20 trains the classifier to classify the different types of object by using a machine learning process on the extracted features. In the embodiment of FIG. 3, the machine learning process comprises random forest. In other embodiments, any suitable method of machine learning may be used.

In the present embodiment, the features used to train the classifier are the 661 features described above with relation to FIG. 2: all 8 channels of raw radar signals; avg and abs across all 8 channels; absolute and root means square (rms) for each channel (x8); global maxima, global minima, avg, abs and rms for all channels.

Through feature selection analysis, we found the derived features are highly ranked. Nonetheless, the remaining features may also be important to fully capture the subtle signal behaviours and may be important for training new objects.

The classifier, once trained, may be used to classify objects, for example by performing the method of FIG. 2. Examples of classifier training are described below.

We experimented with different machine learning classifiers and ended up with two candidates: SVM and random forest. We finally selected random forest due to its established fast computation time, low memory footprint and in initial tests it outperformed SVM slightly. We trained our random forest classifier using the Weka API, with the default parameters. Once the classifier has been trained, classification can proceed in real-time.

The development of RadarCat was based on iterative technical design decisions. We leveraged improved knowledge and analysis of radar signal signatures, machine learning and classification results in the development of our final approach. The signatures, unique to each object, are measured when the object is proximate to the sensor, and allows us to classify the object using a machine learning technique. Our goal is to overcome the limitations of camera-based systems, with an embedded sensor that can detect surface material at high speed and accuracy. When the object is placed on or touched by the sensor, the near and fixed distance together with the fixed incident angle may make our classification task straightforward and allow for accurate classification. The final design of RadarCat incorporates the following capabilities and aspects (a) non-destructive, non-tagging, no illumination (b) use with surface materials, composite objects and certain body parts and (c) identification of new sensing applications and practical use cases and interaction that are brought to bear by a portable radar technology.

We explore the potential of enabling computing devices to recognize proximate materials or objects they are touching with RadarCat. Our sensing approach exploits the multi-channel radar signals, emitted from a Project Soli sensor, that may highly characteristic when reflected from everyday objects; as different materials, thickness and geometry of the object will scatter, refract and reflect the radar signals differently. We employ machine learning and classification techniques on these signals, demonstrate that we can reliably extract rich information about the target material or object, and leverage this to enable interaction capabilities. Beyond HCI (human-computer interaction), RadarCat may also open up new opportunities in areas such as navigation and world knowledge (e.g., low vision users), consumer interaction (e.g., scales), or industrial automation (e.g., recycling).

RadarCat may provide a degree of surface level penetration as long as the outer layer is not highly reflective to the radar signal. This may allow us to explore materials and classify object without being limited to just what is visible on the surface.

Although radar technology has been used for decades in aircraft tracking, security scanners and non-destructive testing and evaluation, we are not aware of any previous attempt to explore this technology for enabling proximate interactions in the field of human-computer interaction and ubiquitous computing. As such, our contributions may be:
1. Exploration of radar sensing to capture details of a proximate target and introduction of a technique that shows the potential of re-using tiny radar to:
   (a) Classify everyday objects and recognize their orientation, or if a liquid is added.
   (b) Classify and differentiate transparent yet visually similar materials.
   (c) Classify different human body parts.
2. Series of studies showing that our sensing approach is accurate, which demonstrates the potential of RadarCat in a variety of real-world applications.
3. Identification of practical use-cases for real-world applications, and implementation of four example context-aware applications enabled by RadarCat.

In RadarCat we present a small, versatile radar-based system for material and object classification which may enable new forms of everyday proximate interaction with digital devices. We demonstrate below that we can train and classify different types of materials and objects which we can then recognize in real time. Based on established research designs, we report on the results of three studies, first with 26 materials (including complex composite objects), next with 16 transparent materials (with different thickness and varying dyes) and finally 10 body parts from 6 participants. Both leave one-out and 10-fold cross-validation demonstrate that our approach of classification of radar signals using random forest classifier is robust and accurate. We further describe four examples of use including a physical object dictionary, painting and photo editing application, body shortcuts and automatic refill based on RadarCat. We conclude with a discussion of our results, limitations and outline future directions.

We conducted multiple studies, based on existing study designs, to evaluate several facets of RadarCat to support multiple purposes: i) everyday material and object classification ii) transparent material classification and iii) body parts classification. Our results, both post-hoc and real-time analysis, show that it is accurate and robust. The studies were conducted in a quiet lab, with objects trained and tested in the same location. The Soli sensor was left powered on for 10 minutes as a warm-up phase before the study.

A first study evaluates the classification accuracy and scalability of RadarCat on a broad range of everyday objects, such as those commonly found in the office and the kitchen. We selected 26 materials from our lab, each of which was assigned a respective letter as listed below:

A Air
B Aluminium
C Copper
D Steel
E Glass (Empty)
F Glass (Water)
G Tray Plastic
H Plate (Ceramic)
I Plate (Porcelain)
J Eraser
K Sponge
L Keyboard (Plastic)
M Keyboard (Surface)
N Nexus 5 (Front)
O Nexus 5 (Back)
P Nexus 10 (Front)
Q Nexus 10 (Back)
R Rubber Case
S Mousepad
T Tile
U Wood
Book
W Purse
X Weighing Scale
Y CD
Z HDD External.

We sampled each of the 26 materials twice a day for three days.

Figure 5:
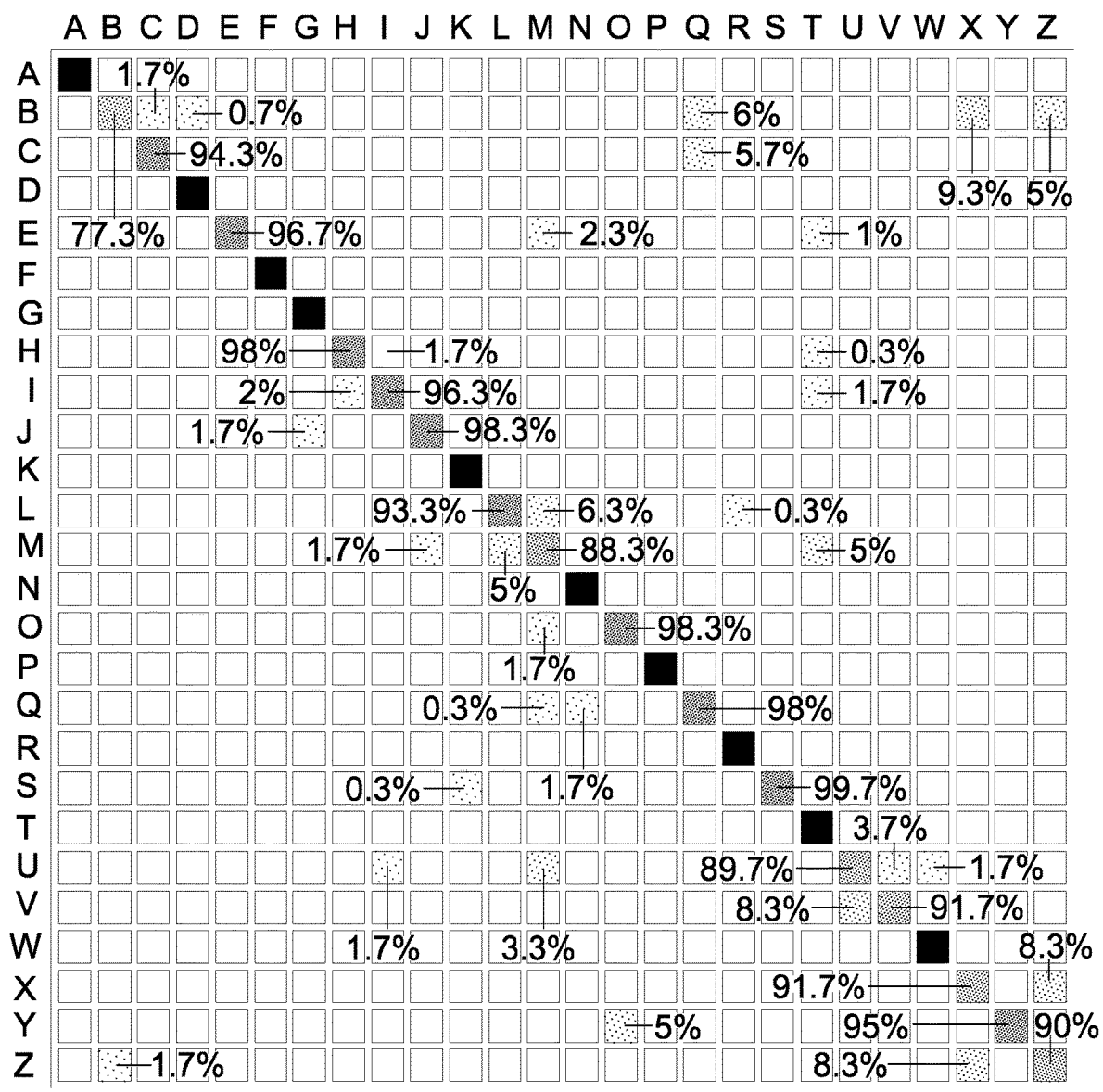
FIG. 5 is a confusion matrix for 26 materials and objects.

In each session, the material is being placed ten times on the sensor at different positions and orientation, by removing it and replacing it by hand. The material to be sampled is selected randomly from the pool of 26 materials, and no two materials were collected consecutively, to ensure that the sensor couple differently with the materials. Each time a material was sampled, five data points were recorded over a 0.17 second period (30 Hz). After five iterations (i.e. after each material had been placed on the sensor five times), the radar clutter map was rebuilt to reduce background noise. This produces 300 data points per material (6 sets of 50, each data point comprising 661 features as described above). Due to this large dataset, we performed offline machine learning analysis. We trained our random forest classifier using five of the six sessions of the collected data and then evaluate the classification accuracy using data from the remaining session. This leave-one-out process is repeated for all combinations of sessions (6 rotations), and the average accuracy is 96.0% (SD=1.3%). The confusion matrix is shown in FIG. 5. Conventional 10-fold random holdout cross-validation using all samples which yields an optimistic accuracy of 99.97%.

FIGS. 4A to 4E show 8-channels raw radar signals for different materials. FIGS. 4A to 8 correspond to figures from Yeo, H S, Flamich, G, Schrempf, P, Harris-Birtill, DCC & Quigley, A J 2016, RadarCat: Radar Categorization for input & interaction. in *Proceedings of the 29th Annual Symposium on User Interface Software and Technology*. ACM, pp. 833-841, 29th ACM User Interface Software and Technology Symposium, Tokyo, Japan, 16-19 October.

Figure 4A:
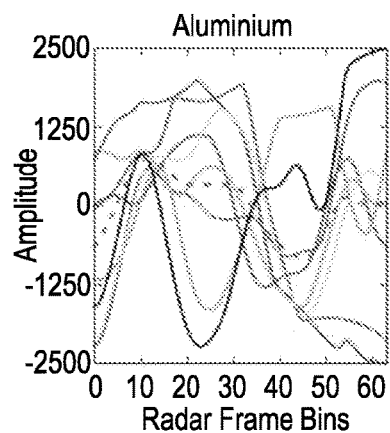
Figure 4B:
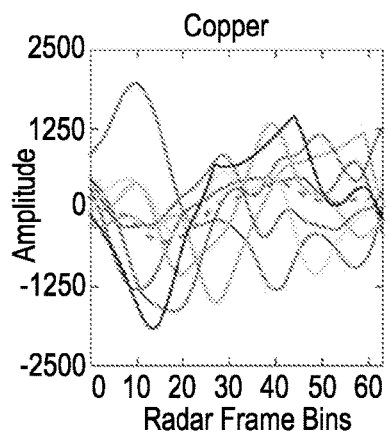
Figure 4C:
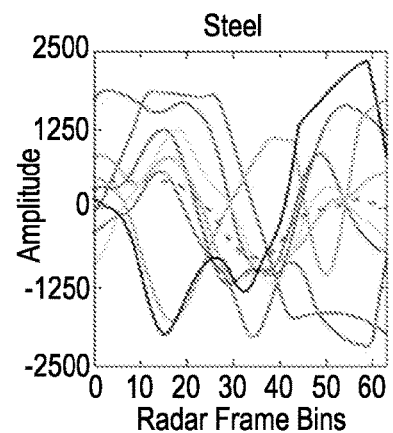
Figure 4D:
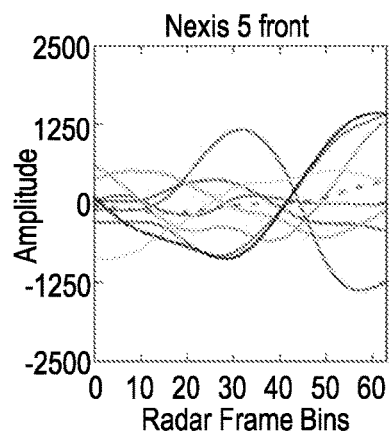
Figure 4E:
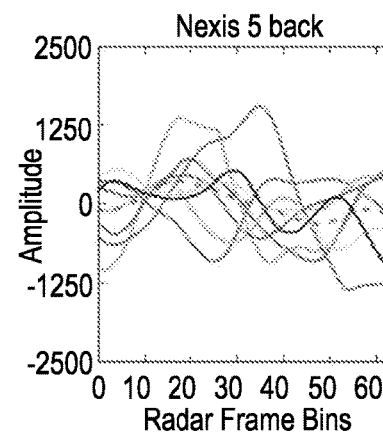
Figure 4F:
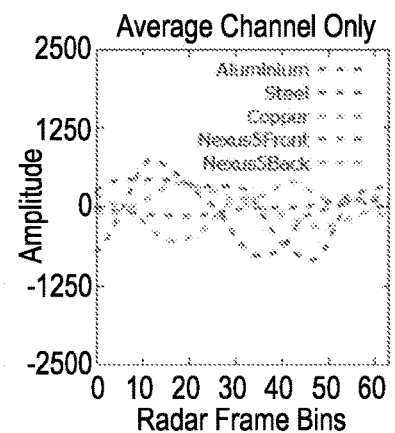
FIG. 4F shows a combined view.

In each of FIGS. 4A to 4E, the dotted line is the average of 8 channels. FIG. 4A shows signals for aluminium. FIG. 4B shows signals for steel. FIG. 4C shows signals for copper. FIG. 4D shows signals for a phone (Nexus5 front). FIG. 4E shows signals for a phone (Nexus5 back). FIG. 4F is a combined view using the average channel. The X-axis represents samples number, where each sample is 555 nanosecond long, as the sample rate is 1.8 mega samples per second.

A further study evaluates the classification accuracy of RadarCat on transparent materials. We were able to source transparent materials from online plastic distributors and a local chemistry department. Each of the transparent materials was assigned a respective letter as listed below:

A Air
B PETG
C PVC
D Acetate
E Polycarbonate
F Boroglass
G Slide
H 3 mm Acrylic
I Red Acrylic
J Green Acrylic
K Blue Acrylic
L 2 mm Acrylic
M 4 mm Acrylic
N 5 mm Acrylic
O 6 mm Acrylic
P 8 mm Acrylic
Q 10 mm Acrylic All materials are in 3 mm thickness and A4 size, except Borosilicate glass at 200×200 mm, PVC at A3 size and microscope slide at 75×25 mm. In addition, we add in extruded acrylic of different thickness (2, 3, 4, 5, 6, 8.10 mm) and extruded acrylic of same thickness (3 mm) but with different dyes (red, green and blue), resulting in a total of 17 materials, including air.

Figure 7:
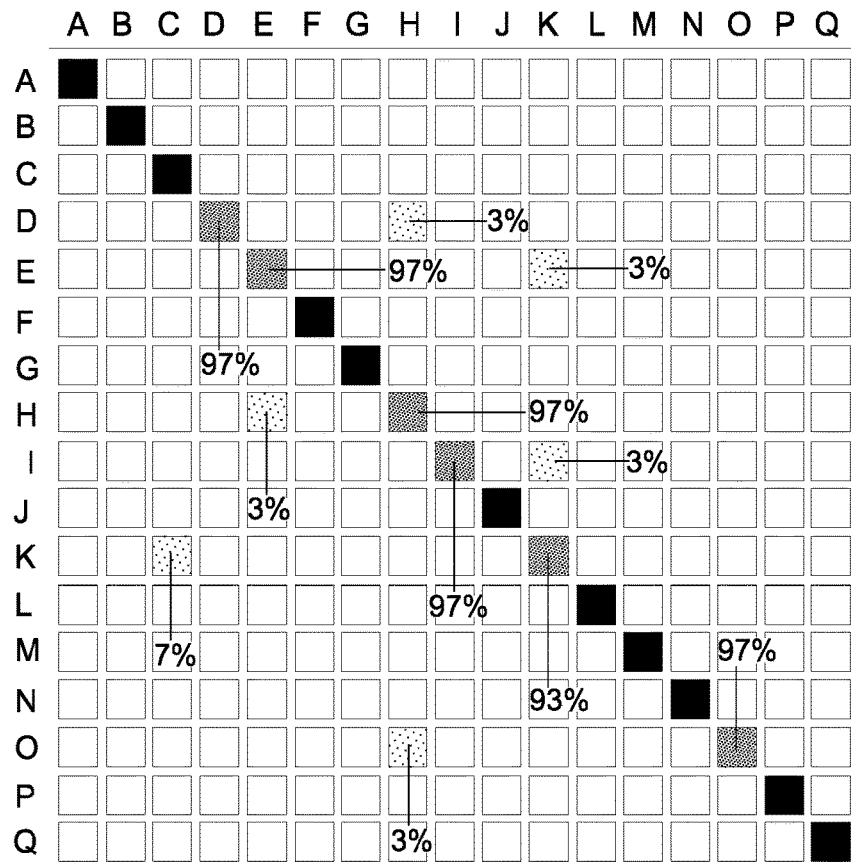
FIG. 7 is a confusion matrix for 17 transparent materials.

We use the same procedure as the first study to collect the sample data (placing the objects ten times randomly, each time capturing five samples). Since the material is uniform when placed at different positions and orientations, we collected data for only three sessions, separated by one day each. We trained our random forest classifier using two of the three sessions of the collected data and then evaluated the classification accuracy using data from the remaining session. This leave-one-out process is repeated for all combinations of sessions (3 rotations), and the average accuracy is 98.67% (SD=0.9%). The confusion matrix is shown in FIG. 7. Conventional 10-fold random holdout cross-validation using all samples yields an optimistic accuracy of 100%.

Figure 6A:
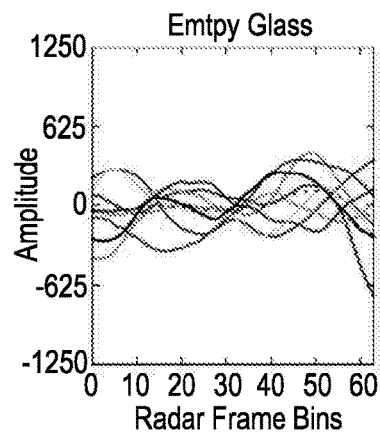
Figure 6B:
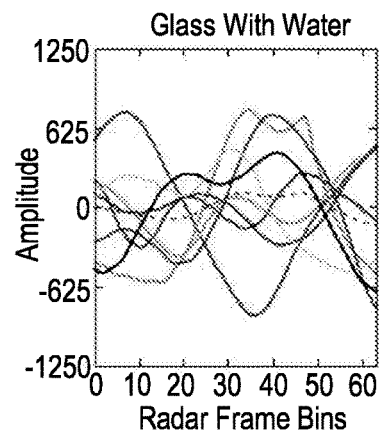
Figure 6C:
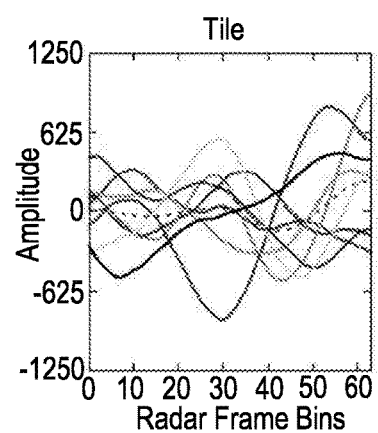
Figure 6D:
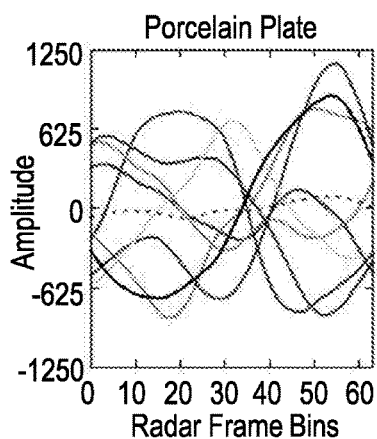
Figure 6E:
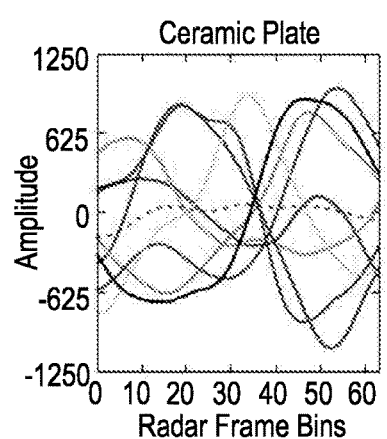
Figure 6F:
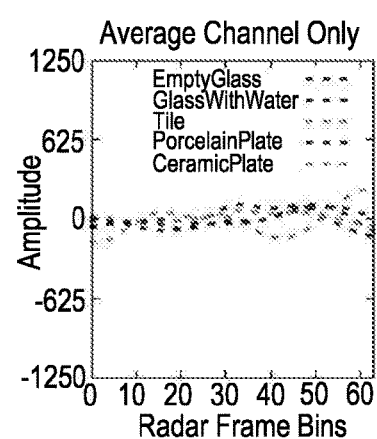
FIG. 6F shows a combined view.

FIGS. 6A to 6E show 8-channels raw radar signals for similar materials. In each of FIGS. 6A to 6E, the dotted line is the average of 8 channels. FIG. 6A shows signals for an empty glass. FIG. 6B shows signals for a glass filled with water. FIG. 6C shows signals for tile. FIG. 6D shows signals for porcelain plate. FIG. 6E shows signals for ceramic plate. FIG. 6F shows a combined view using the average channel. The radar signals are different for each material.

A further study evaluates the accuracy of RadarCat on classifying different body parts when they are touched. We initially selected the palm, back of hand, finger, forearm, belly and calf for our experiment. We further add in body parts covered by clothes: upper body wear, lower body wear, outerwear and glove, resulting in a total of 11 parts, including air, as listed below:

A Air
B Palm
C Back of Hand
D Finger
E Forearm
F Belly
G Calf
H Shirt
I Pants
J Outerwear
K Glove We recruited 6 participants (2 females, mean age 20). During the data collection session, participants were instructed to put the sensor on different body parts and apply a small amount of pressure, as if they are using a stethoscope. We use the same procedure as the first and second study (placed ten times, each time capturing five samples). This procedure allows us to capture the variability performed by participant and we collected data for one session.

Because participants wore their own clothing, which are different among the participants, we employ per-user classification, where each participant had a custom classifier trained using his or her training data. This is ideal for personalized interaction with his or her own body parts but not for a generic classifier targeting all users. Following the training phase, we perform real-time classification evaluation, by using the collected data from the particular participant to initialize the system. Participants were requested to perform one of the sensor body placements from the training set for three times. This was repeated for all the gestures. The experimenter then recorded the on-screen result, which was not visible to the participant.

Figure 8:
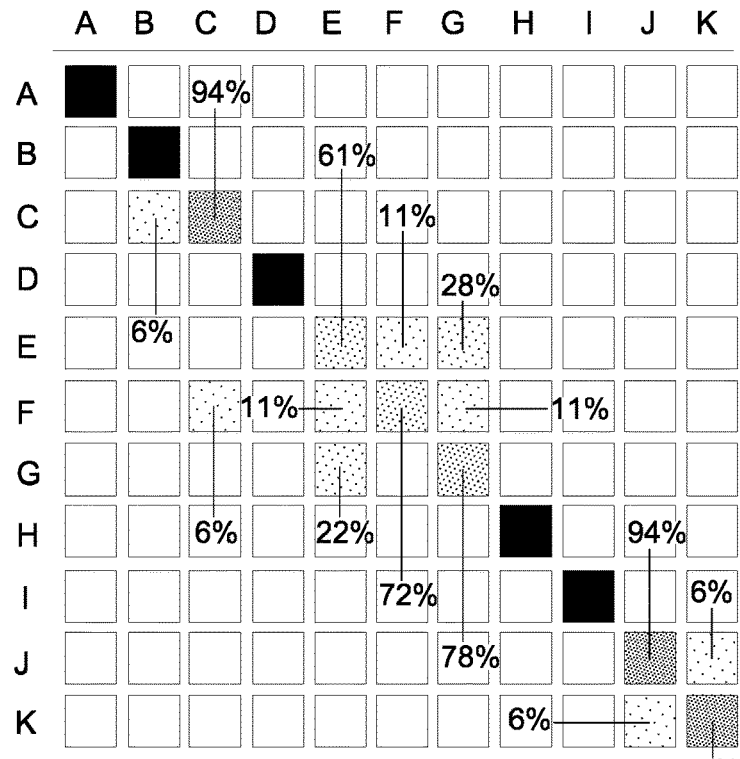
FIG. 8 is a confusion matrix for 11 body parts.

Real time evaluation using per-user classification shows an average accuracy of 90.4% (SD=13.6%) while post-hoc analysis using 10-fold cross validation yields 99.67% average accuracy. The confusion matrix is shown in FIG. 8.

We also perform post-hoc analysis on the generic classifier (leave-one-out, using data from 5 users, test on remaining 1 user; note that they are all wearing different clothing) and the average accuracy is 62.15% (SD=11.69%, with clothing data) and 70.86% (SD=8.44%, clothing data removed), respectively. Although there are certain levels of cross user similarities, it is not reliable enough for general use, suggesting that per-user training is more appropriate for body parts classification. Nonetheless, conventional 10-fold cross validation with all six users data yields 99.82% accuracy (with clothing data) and 99.81% (clothing data removed).

While the levels of accuracy are very high overall, and the levels of confusion are very low as shown in FIG. 5, we can see where single material types and composites can be confused, for example, a macbook cover (aluminium) vs. weighing scale (contains aluminium). Likewise, wood can be occasionally be confused with a book. However, items (e) and (f), a filled and unfilled glass of water provide no confusion to each other, demonstrating the extent of the signal penetration and reflection required for RadarCat to disambiguate different materials and objects.

The results of this study further show that it is possible to recognize the front and the back of a mobile device, or recognize different models (e.g., Nexus5 and Nexus10). While the surface material of different models is the same (glass), the internal composition (different arrangement of the chipset) makes them differentiable by radar sensing. Some objects are composite (e.g., phone, tablet, eraser) which contains different materials in a thin form factor, while some materials are single and solid (e.g., glass, aluminium, plastic), while others have varying density throughout (e.g., wood). The states of electronic devices (switched on/off) did not affect the result.

Based on our testing, we can suggest that:
i) For flat and solid materials (flush), very little training is needed to achieve the accuracy reported here, with the varieties of objects indicated.
ii) For flat but low-density materials (sparse, hollow), more training from different positions and orientations of a single axis is needed but it is still possible to achieve high accuracy.
iii) For non-flat materials, due to their geometry, more training from different positions and orientations from all three axes is required, which can limit the suitability of this training approach, but is an interesting direction for future research.

Experimentation with a smaller set of features, and a larger range of objects, in a wider set of scenarios is also required. Deep-learning methods are applicable to improve the scalability and generalization to everyday objects (e.g., apples of different sizes). In addition, the extent of material characteristics (e.g., types of liquid) is an area of rich future work. Little can be added to the results presented in FIG. 7 due to the high levels of accuracy reported. Given the frequency range of the radar we suggest it is the absorption/scattering properties and concentration of the dye we are classifying along with the different thicknesses of materials. This means, we can not only differentiate visually similar materials like different types of transparent plastics but also color. The extent of this, given different dye properties, thicknesses, material surface characteristics requires further exploration.

Finally, the results of the body parts study demonstrate that the forearm (E), belly (F) and calf (G) confused each other with E to F (0.11), E to G (0.28), G to E (0.22), F to G (0.11), while the rest of the body parts performed well. While this requires further study, we believe that the confusion of forearm, belly and calf may be due to these three body parts having somewhat similar structures (flat with mostly tissue and muscle) and hence appear similar to RadarCat, given that millimeter waves only penetrate shallowly into human tissue, typically less than 1 mm.

In contrast, the palm, finger and back of hand each have very different structure near the 1 mm range that the radar can "see", due to the shape, nature of skin, bone and blood vessels near the surface, thus RadarCat differentiates this easily and has a higher accuracy. We also observe certain level of variability across users. For example, P1 has perfect accuracy on all trials on all body parts, while P4 has good accuracy on forearm and belly but 0 correct on calf and P5 has perfect accuracy on calf but 0 correct on forearm and belly (both are recognized as calf). Finally, body parts covered by clothes are often very accurate (FIG. 8).

There are many immediate applications that RadarCat may support (e.g., automatic waste sorting). We designed and implemented four example applications that demonstrate different interaction possibilities if the proximate target material or object is known.

In an embodiment, the RadarCat system is used to provide a physical object dictionary. When an object is placed on the sensor, the system can recognize the object and automatically search for relevant information or language translation, and then feedback this to the user. This may be useful because searching online often requires the user to know the name of an object in the first place. However, there are times when users are not aware of the name of an item—e.g., a specific phone model, which will make searching for it difficult. It also may aid in learning environments because we can relate physical objects in-situ to improve learning efficiency. In other embodiments, any appropriate information may be provided for any appropriate objects or classes of objects.

In an embodiment, the RadarCat system is used to provide input to a painting and photo editing application. Users can use the RadarCat system as a physical probe instrument, to quickly and intuitively change an operating mode (scale, rotate, pan) or a brush (size, color, style) of the painting or photo editing application depending on what the probe is sensing. For example, touching plastics of different materials using the radar unit may switch the operating mode while touching plastic of different color or thickness may change the brush's paint color and size. In other embodiments, any suitable input may be provided in dependence on classification of an object by the RadarCat system, for example any suitable command or change of operating mode.

In an embodiment, the RadarCat system is used to provide context-aware interaction and body shortcuts. With RadarCat attached to the back of a phone, the system can tell whether the phone is held by bare palm or palm wearing a glove. This may allow the phone to switch intelligently to easy mode, in which the buttons of the phone are considerably larger to accommodate the fat finger problem when wearing a glove. In addition, touching different body parts may activate different shortcut commands instantly. For example, touching the back of the hand, tummy (belly/trunk) and leg can be programmed to launch clock, food or map applications, respectively. It may also be possible to know whether the phone is placed on the table, the sofa or inside the pocket (placement aware), facing up or facing down (situation aware), and allow the phone to switch into different modes automatically to adapt the environment, such as silent mode or loud speaker mode or turning the screen off to save battery. In other embodiments, the system may provide any suitable context-aware interaction and/or body shortcuts.

In an embodiment, the RadarCat system is used to provide automatic refill. In a bar or restaurant scenario in which RadarCat sensors are embedded ubiquitously beneath the surface of a table (for example, tiled across an upper or lower surface of the table), the system can tell whether a cup is full or empty, and if it is the latter, the system can alert the waiter for refill, all without intervention of the user.

In further embodiments, the fill level of any liquid may be sensed in any suitable context. The liquid fill level sensing may be used in an industrial context, for example in a factory. In some embodiments, a user (for example, the waiter) is notified based on the classification of the fill level of a receptacle. In other embodiments, a receptacle may be refilled automatically without the intervention of a human.

In some embodiments, one or more radar units is incorporated within a fridge. In some embodiments, the fridge also incorporates a processor configured to classify objects within the fridge based on radar signals received from the radar units. In other embodiments, the fridge may be configured to send data representative of the radar signals to an external computing device.

The processor (or external computing device) may be configured to classify food and/or drink items inside the fridge. In one embodiment, radar units are incorporated into a shelf of the fridge that is configured to hold bottles, for example milk bottles. If the fill level of a bottle in that shelf becomes low, the processor may notify a user that the fill level is low. In some embodiments, the processor may also be configured to automatically order another bottle to replace the one for which the fill level is low.

In other embodiments, one or more radar units may be incorporated into any suitable domestic appliance, for example a fridge, washing machine, dryer, cooker, oven, microwave oven, grill, blender, or food processor.

In some embodiments, the RadarCat system may be used for object classification and level sensing for consumer testing.

In a further embodiment, the RadarCat system is used in a recycle center. Human intervention is often still needed to separate different types of waste, such as metal, glass and wood. With RadarCat, sorting waste may be automated. A classifier may be trained to distinguish different types of waste. Waste may be sorted by a human or automatically in dependence on classification data provided by the classifier.

In another embodiment, the RadarCat system is used for assisting the visually impaired. While one's sense or touch and smell can mitigate many of the challenges faced without sight, in some embodiments RadarCat may be embedded in gloves or shoes and may enhance one's understanding of the environment around you. For example, RadarCat may be able to identify different surfaces that are not distinguishable by touch. Tactile paving on the sidewalk or limited Braille interfaces might be replaced in the future.

In a further embodiment, the RadarCat unit may be used to provide smart medical devices. Current digital medical devices used outside the body, such as thermometers or stethoscopes may still require the operator to manually note the different body parts being measured. Future devices with RadarCat embedded may allow the automatic tagging of recorded temperature or sounds with the body part as it is detected. A radar unit may be embedded into a medical device, for example a stethoscope, and receive radar signals reflected from a body part on or in which the medical device is placed. A classifier may use the radar signals to classify the body part. The classification of the body part may be stored along with data recorded by the medical device.

In some embodiments, the RadarCat system may be used to classify objects in, for example a shop or a warehouse. In some circumstances, probing an object using the RadarCat system may be more convenient than scanning a barcode or QR code. In some embodiments, the radar unit is installed in a handheld scanner that is used to probe objects.

For example, a RadarCat system may be used in a mobile phone shop to provide information about different mobile phones. A RadarCat system may be used in a checkout system, for example in a self-checkout system.

In other embodiments, radar units are integrated in, for example, a shelf, tray or production line and are used to classify objects on that shelf, tray, or production line. The RadarCat system may be used to monitor stock.

In some embodiments, object classification may be provided for use in car manufacturing, for example for part installation verification.

In an embodiment that may be used for example in a factory, a radar unit may be embedded in a glove, and information may be provided about items that are picked up using that glove.

In some embodiments, indicator objects are used to encode information about further objects. For example, in a museum, information about an exhibit may be obtained by probing an information label using the RadarCat system, rather than by probing the exhibit directly. Different information labels may be formed from different materials.

In some embodiments, the RadarCat system may be used in vehicles, for example in automated vehicles such as driverless cars, to help detect and/or identify objects around the car. Such detection and/or identification may help with collision avoidance and/or decision making.

While RadarCat is a multi-purpose sensing system and achieves high accuracy in the three studies we conducted, it may not be suitable in all situations. For example, although our studies show that it can differentiate acrylic with different dyes with varying absorption/scattering properties (and hence colors), this may be mainly due to the high concentration of the dye component. In our present studies we were not able to differentiate single "stick-it note" of different colors. Therefore, in certain tasks, especially those involving identifying thin surface material based on color and texture it may be more appropriate to use imaging-based methods The radar hardware we used (Soli) is very sensitive, which may introduces new issues when compared with less sensitive hardware. The high degree of sensitivity may allow us to differentiate visually similar materials at high accuracy but this may be affected by background noise. The radar may gain clutter (reflections of unwanted objects) over time, especially before the hardware has reached a steady state temperature, or due to the movement or environmental changes. Radar clutter may impact the recognition rate, because the training data were collected with clutter removed. In practice, the clutter map may be easily rebuilt and/or adaptive clutter removal may be employed.

We have presented RadarCat, a sensing technique to provide versatile, multi-purpose material and object classification which may enable various forms of interaction and automated processes.

Our studies show that RadarCat is accurate and robust and we believe we have demonstrated its potential and implications in everyday interaction. Our technique may be used independently or combined with other sensing approaches. This can improve the sensing and computational edifice around which we realize new mobile, wearable and context-aware user interfaces.

Future work may explore a smaller set of channels, features and fewer sample points to explore the limits of object discrimination. For objects made of similar materials with strong radar reflections, investigation of the signature of those objects along different dimensions may be undertaken. In addition, the materials scattering and absorption properties at these wavelengths may be investigated further. We further wish to empirically validate the observed ability to recognize different fruits or credit cards, or counting the number of poker cards, or differentiating liquid content in a container. Finally, we would like to explore ways to encode information into an object, or stacking multiple layers of different materials which can be sensed, for example in real time for interaction.

Specific classifiers are described above. In other embodiments any suitable procedure for classifying may be used. Any suitable software, for example any suitable machine learning software, may be used. Any suitable radar unit may be used instead of, or in addition to, the Soli radar unit. The radar unit may operate at any appropriate radar frequency.

Tangible computing may integrate mappings or control of computation into physical artefacts. In further embodiments, we focus on digital-physical approaches to recognize and track un-modified or self-contained objects, the use of simple add-on modules to enhance sensing and object identification or internal structure determination techniques.

It is demonstrated that a radar unit (for example, the Soli radar unit 10) may be used not only for disambiguating objects but also for tangible interaction.

A prototype was developed, which may be referred to as Solinteraction. The prototype comprises a Soli radar unit 10 and a computing device, which may comprise a laptop computer 20 as shown in FIG. 1. The prototype also comprises a plurality of 3D printed cases and modules that are configured to be used in combination with the Soli radar unit 10, and are described further below.

On the computing device is implemented a graphical user interface and a classifier backend in Java using Weka API. In some embodiments below, the classifiers used by the Solinteraction prototype are different to those described above with regard to RadarCat. For example, the Solinteraction classifier backend may comprise classifiers trained to count objects, determine an ordering of objects, or determine an object orientation.

The Solinteraction prototype may be considered to rely on both hardware and a sensing layer along with bespoke applications which may demonstrate the potential of each form of interaction. For the hardware, the Google Project Soli developer kit (7×5×1.4 cm with heat sink) was used as described above with reference to Soli radar unit 10. The sensing layer may be implemented on the computing device, for example laptop computer 20. In some circumstances, the Solinteraction prototype may greatly extend sensing capabilities previously demonstrated in radar-based object recognition. In some embodiments, combinations of static and dynamic objects may also be classified, detected and repurposed for various forms of tangible interaction.

As described above, the Soli platform is a mono-static, multi-channel radar device, using frequency modulated continuous wave (FMCW) operating in the 57-64 GHz range. FIG. 1 shows an object 30 placed on top of a Soli radar unit 10. When an object is placed on the top of or near to the Soli sensor, the energy transmitted from the sensor may be absorbed and scattered by the object. An amount of energy that is absorbed and/or scattered may vary depending on its distance, thickness, shape, density, internal composition and surface properties. An amount of energy that is absorbed and/or scattered may vary depending on the radar cross section (RCS). As a result, the signals that are reflected back may represent rich information and the contributions from a range of surface and internal properties.

A basic sensing layer for Solinteraction may be provided by any suitable computing device, for example the laptop 20 illustrated in FIG. 1. The basic sensing layer provides signal extraction and features extraction. The basic sensing layer may optionally provide signal processing. The basic sensing layer provides a machine learning classifier. The basic sensing layer provides an interconnection to the application in which results are sent to the application.

In an embodiment, the basic sensing layer records the multi-channel raw radar signals reflected back from the object. The basic sensing layer classifies the raw radar signals using a machine learning technique. Following a supervised learning approach, software of the basic sensing layer extracts a set of features. The software may classify objects which have different physical characteristics without requiring any instrumentation. In some embodiments, the Solinteraction system implements classifiers that differ from those described above with reference to the RadarCat system.

A basic implementation follows the approach described above, for example with reference to FIG. 2. An object 30 or a plurality of objects are placed in proximity to the sensor, for example on top of the enclosure 18. The Soli radar unit 10 transmits an FCMW radar signal, part of which is reflected from the object or objects. The Soli radar unit 10 receives the reflected radar signals.

In embodiments described below, we use the raw signal from 8 channels (512 features) and extract extra features resulting in a total of 661 features. We also use a range feature provided in the Soli SDK (software development kit). The SDK allows the Soli sensor to be connected to the computer, and obtains the signal from the Soli sensor. The SDK may also provide features such as signal processing and/or software libraries.

The range feature in the Soli SDK provides a measure of a distance of an object from the Soli sensor. The range feature provided in the Soli SDK may provide a relatively coarse estimation of range.

We employ a moving average of 10 frames within a 1 second window, where the sensor is running at 300 fps. The features are fed into a Weka toolkit, both for classification and regression in real-time. The Weka toolkit provides the classifier backend. The Weka toolkit is a toolkit for machine learning. In other embodiments, the Weka toolkit may be replaced by another machine learning toolkit, for example Scikit-learn or Tensorflow.

Finally, the classification is stabilized by taking the most common classification amongst the last 10 outputs. In one embodiment, the system and classification runs in real-time on a low-power Intel NUC with i3 CPU.

The computing apparatus outputs a classification, which may comprise, for example, a number of objects, an ordering of objects, an orientation of one or more objects, or a distance to one or more objects. The classification may be displayed, for example on a display screen of the computing apparatus. The classification may be used as an input to a computer program or device.

In some experiments described below, classification using a Random Forest classifier is compared to classification using a Support Vector Machine (SVM) classifier. In some embodiments, a training process for training the classifier is similar to the training process described above with reference to FIG. 3.

In some of the embodiments described below, radar signals are received from an object or plurality of objects that is positioned in proximity to the Soli radar unit 10 as described above with reference to FIGS. 1 and 2. No additional case or module is added to the Soli radar unit 10.

In others of the embodiments described below, a case and/or module is added to the Soli radar unit 10. In embodiments described below, a case may be a structure that is configured to at least partially surround the Soli radar unit 10, and a module may be a structure that is configured to be attached to a case. In other embodiments, a case or module may be any structure that surrounds, attaches to, or is placed near to the radar unit. In some embodiments, a flat piece of plastic may be used, and may be attached to the radar unit 10, for example by using glue or tape. However, by using a case that at least partially surrounds the radar unit 10, a form factor may be provided that is easy to snap on to the radar and/or swap out.

The case and/or module may facilitate positioning of the object or objects. For example, the case and/or module may be configured to hold the object or objects, or to otherwise guide the positioning of the object or objects. FIGS. 9a to 9l show various 3D printed cases and modules for guiding objects and signals, e.g. numpad, rotation, sliding, Lego holder, card holder and slotting disc holder. In the embodiments shown in FIGS. 9a to 9l, the cases and modules are 3D printed. In other embodiments, any method of fabricating cases and/or modules may be used.

Figure 9A:
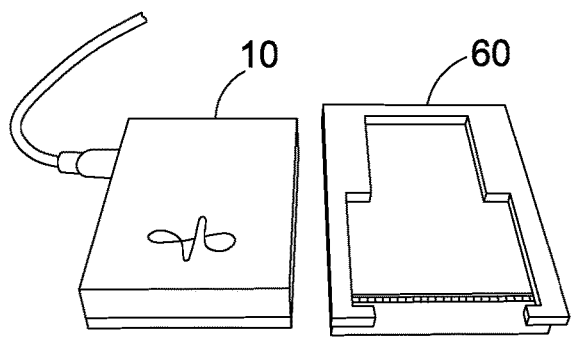
FIGS. 9a to 9l show 3D printed cases and modules for guiding objects and signals.
Figure 9B:
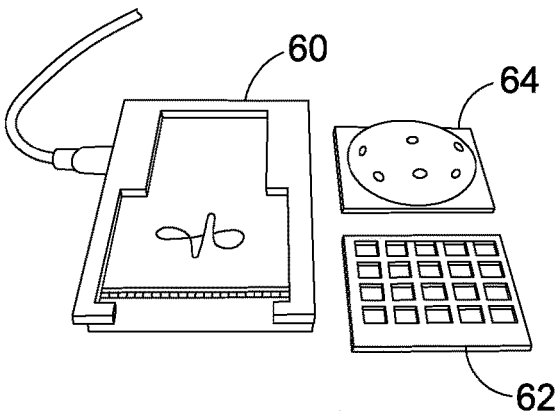
Figure 9C:
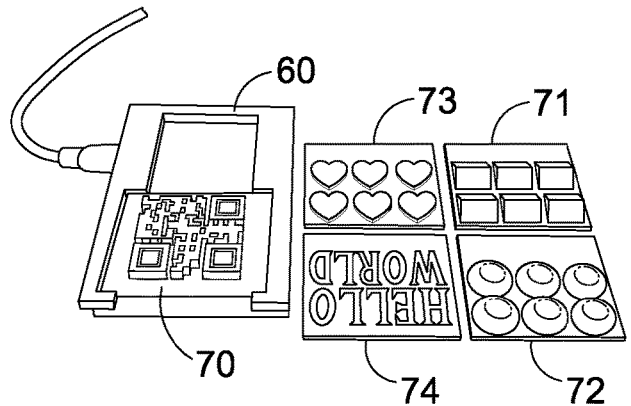
Figure 9D:
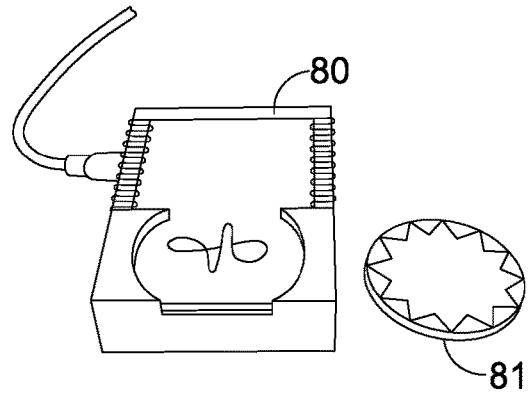
Figure 9E:
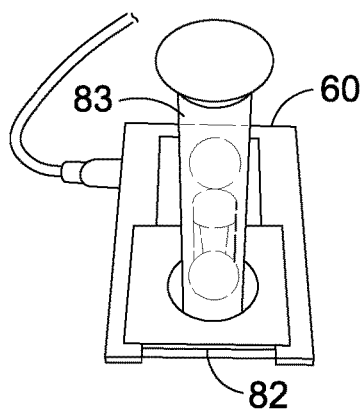
Figure 9F:
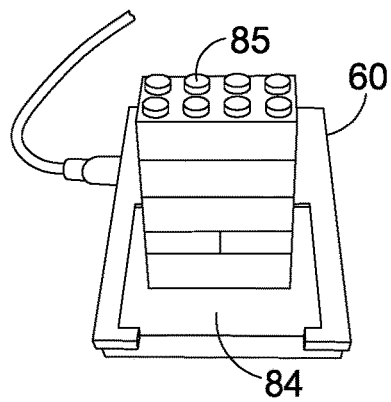
Figure 9G:
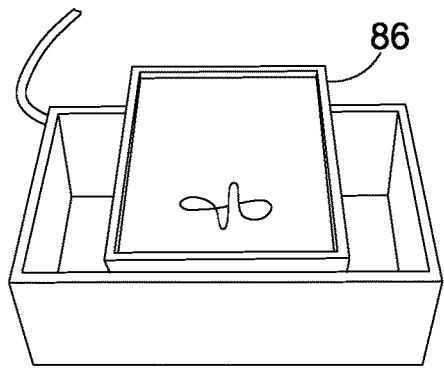
Figure 9H:
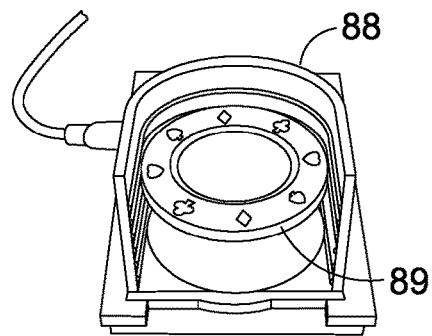
Figure 9I:
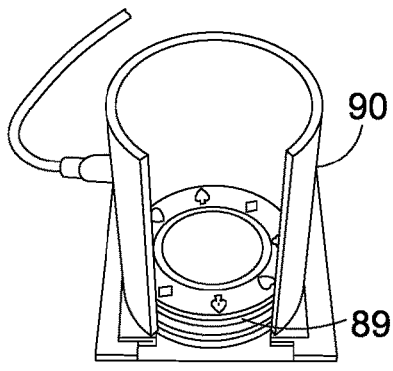
Figure 9J:
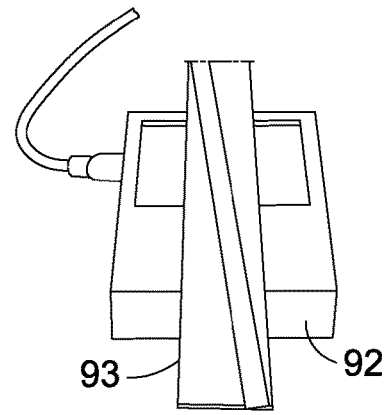
Figure 9K:
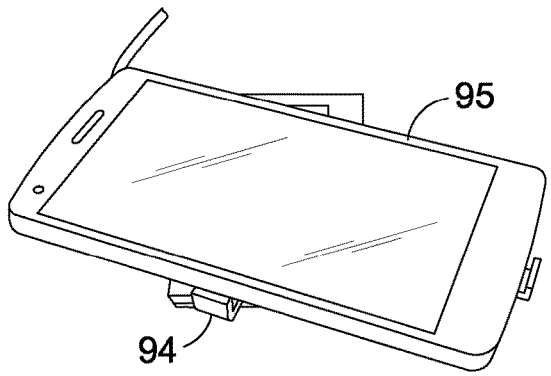
Figure 9L:
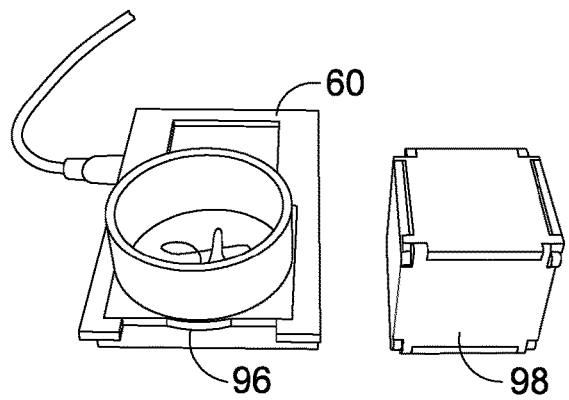

FIG. 9a shows the Soli radar unit 10 and a case 60 configured to fit round the Soli radar unit 10. FIG. 9b shows the case 60 along with a guidance layer 62 and a half-sphere 64. FIG. 9c shows the case 60 in combination with various differently-shaped designs 70, 71, 72, 73, 74. FIG. 9d shows a further case 80 in combination with a poker chip 81. FIG. 9e shows case 60 in combination with a module 82 configured to hold an hourglass 83. FIG. 9f shows the case 60 in combination with a module 84 configured to hold a stack of Lego 85. FIG. 9g shows a further case 86. FIG. 9h shows a further case 88 configured to hold a poker chip 89 in different positions. The case 88 has a set of slots into which the poker chip 89 can be slotted. FIG. 9i shows a further case 90 configured to hold a stack of poker chips 89. FIG. 9j shows a further case 92 and associated bar 93. FIG. 9k shows a module 94 configured to hold a phone 95. FIG. 9*l* shows a further case 96 and a cube 98.

In some of the embodiments described below, different designs of objects are used, for example to demonstrate the ability of the Solinteraction prototype to distinguish between different shapes, positions, or other properties of objects. Different designs may comprise different plates that provide different radar reflections, and so may be differentiates using their radar reflections.

Figures 10A, 10B, 10C, 10D:
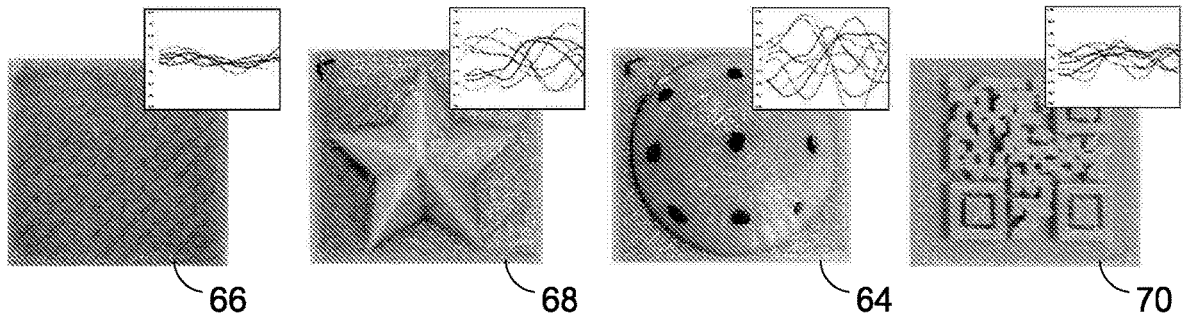
FIGS. 10a to 10l each show a respective fabricated design and a corresponding radar signal for that design.
Figures 10E, 10F, 10G, 10H:
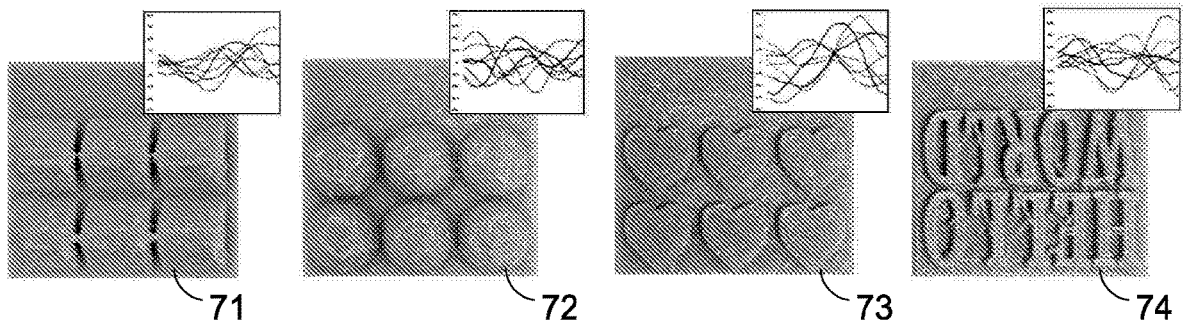
Figures 10I, 10J, 10K, 10L:
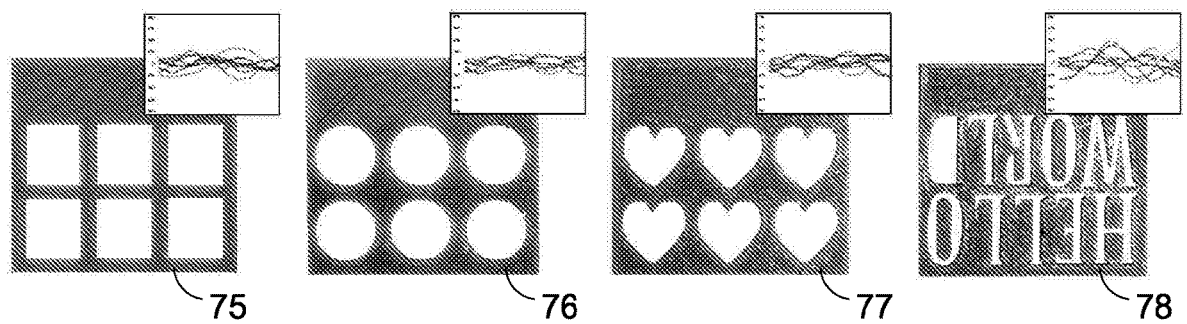

FIGS. 10*a* to 10*l* show our fabricated designs and corresponding radar signals which may be unique to each design. FIG. 10*a* shows a flat 3D printed design 66. FIG. 10*b* shows a star design 68. FIG. 10*c* shows the half-sphere 64. FIG. 10*d* shows a QR code design 70. FIG. 10*e* shows an array 71. FIG. 10*f* shows an array of circular elements 72. FIG. 10*g* shows an array of hearts 73. FIG. 10*h* shows a design 74 having the text Hello World. FIG. 10*i* shows an array of square apertures 75. FIG. 10*j* shows an array of circular apertures 76. FIG. 10*k* shows an array of heart-shaped apertures. FIG. 10*l* shows a design 78 having apertures forming the text Hello World.

Each of FIGS. 10*a* to 10*l* has an inset showing the radar signals obtained by reflecting radar from the design shown in that figure. The y-axis's range is 800 for each graph.

The fabrication approach of the designs, cases and modules shown in FIGS. 9*a* to 10*l* is motivated by two goals. Firstly, we want to explore different kinds of designs and how the internals and externals of objects affect the radar response. Different designs may reflect the signal differently, and so in some circumstances may be uniquely differentiated, even though they are printed using the same material. The designs may be considered to be representative of different types of object that may be classified by the Solinteraction system.

Secondly, we wanted to quickly and cheaply create modules, for example snap-on modules, that may be easily swapped out for augmenting different functionalities. In particular, we explore how a convenient holder may afford various types of interaction with primitive building blocks such as Lego or even the users' finger.

Modules illustrated in FIGS. 9*a* to 9*l* were created by 3D printing them using a Replicator 2X printer. In other embodiments, any method of creating modules may be used.

For adding tags, copper tape was applied in various embodiments. In other embodiments, any method of adding tags may be used, for example any method by which conductive tags may be created. Various methods and materials for adding tags are possible, for example printing conductive ink on, or etching a PCB.

While we rapidly prototype with 3D printing, other means of low-cost manufacturing techniques, such as machining or injection molding, are possible in other embodiments.

The physical properties and geometry of the object, along with the transmitted radar signal propagation pathway, may influence the response properties of the received signal. As such, we systematically explore a range of physical prototypes which may allow us to control and isolate the radar effects. Our mechanical mechanisms allow us to explore effects on radar signal propagation pathways. From this, we determine a series of design recommendations which affect the scattering and reflection of the transmitted signals.

In general terms, the ability to classify materials and objects in real time may enable the use of many physical items as a way to interact with computation. In some circumstances, interaction with computation may be achieved without altering objects and as such may allow existing objects to form parts of new types of interaction.

Once the objects are in proximity of the requisite sensing capabilities it may be possible to enable triggers, cues, actions and other forms of tangible interaction. By extending this technique, not only to static individual objects, but to multiple objects simultaneously and in dynamic situations (e.g., movements), it may be possible to identify a rich design space, not previously explored.

In embodiments described below, six sensing modes are described: the (i) identity, (ii) count, (iii) order of stack, (iv) orientation (v) movement and (vi) distance of object placed on and around the Soli sensor.

These perspectives may be considered to collectively constitute a design space of radar-sensing for tangible interaction that we seek to explore and exploit.

In the experiments below, all of the six sensing modes are demonstrated without an add-on module (for example, without a case or module that is configured to facilitate positioning of an object or objects relative to the radar unit). However, in some circumstances with the module their sensing accuracy may be improved. A case/holder may help to fix the object in position and reduce the degrees-of-freedom of movement of the object, which may reduce the amount of training data required for all dimensions.

To evaluate the accuracy and feasibility of our approaches, we conducted various experiments, covering a broad range of use cases and objects. We report on the close and careful study of Solinteraction with a series of representative cases. We specifically and selectively focus on counting, ordering and identification, by collecting rigorous experimental data. For the rest of the experiments, flipping, distance and movement, we collect less exhaustive datasets for showing the accuracy and feasibility. These experiments show that the system may require little training data to sense the interaction. And for each experiment, we also visually inspect that it performs well in real-time. Our dataset is publicly available at http://bit.ly/solinteractiondata. To avoid over-fitting, we average over 10 frames as single data input. We then apply offline analysis using Weka toolkit, with 10-fold cross-validation (leave-one-out in some cases), where the results are shown in Table 1.

In each of the experiments described below, an object or plurality of objects is positioned in proximity to the radar unit. Reflected radar signals are measured and a classification is performed to obtain classification data.

A total number of visually and physically similar thin objects (e.g., sheets of paper, cash, playing cards or poker chips) stacked on top of the sensor may be determined. Some prior work has recognized stacked objects using optical sensing, but in some cases optical sensing may not be able to support recognition and/or counting of more than a few items. In some circumstances, a radar signal may penetrate multiple layers. However, if objects are to be counted, the objects should not fully obstruct the radio signal propagation. For example, it may not be possible to count stacks of metal sheets. Counting with radar may open up possibilities, for example determining the amount of sand in an hourglass.

In one counting experiment, we start with (i) counting 52 playing cards. Two authors take turns to collect an extensive 60 rounds of data. In each round of data collection, 52 cards are placed on top of the Soli radar unit 10 and one card is removed at a time until no more cards remain. During each card removal, 10 frames are being averaged and saved. For (ii) counting 20 sheets of paper (A4, 90 gsm), a similar procedure is used, except sheets are added to the stack instead of being removed. 10 rounds of data are collected. Due to the large surface area of the paper, a support structure is placed around the sensor to reduce paper curling. For (iii) counting 20 poker chips, we use 2 conditions: with and without a case to hold the chips in place. 30 rounds of data for each condition are collected. A case 90 in which poker chips 89 may be stacked is shown in FIG. 9i. For (iv) counting 5 Lego blocks, we use a case to hold them in place and collected 10 rounds of data. Holding Lego blocks is shown in FIG. 9f. For (v) counting sand in hourglass, we do not evaluate its accuracy but show its potential by recording video which shows a change in radar signals as sand runs through the hourglass. Holding an hourglass 83 is shown in FIG. 9e.

The order in which items are stacked may also be recognized. Our technique is based on the analysis of the signal corresponding to an entire group of objects rather than of single individual items. We experimented with different credit cards and cup coasters stacked in different orders. Using four credit cards we were able to distinguish all the 64 different combinations with very high accuracy when using a card holder, but lower accuracy without.

We can also recognize different combinations of Lego blocks stacked on top of the sensor (with case). It was shown that four double bricks combined with two single bricks, that are placed at different levels can be uniquely identified. Holding Lego blocks is shown in FIG. 9f.

For (i) ordering credit cards, we chose 4 cards that have different radar signature by visually inspecting the radar response using our GUI visualizer. Because there are various designs of credit cards, we chose 3 cards with raised embossed characters and 1 card without. We chose cards that do not have metallic coatings, to allow the radar signal to propagate through multiple layers. We use two conditions: with and without a case to hold the cards in place. With 4 cards there are 64 possible combinations. For the sake of completeness in this evaluation we tested all of them. The procedure when using a case is as follows: place each combination once, and save 1 dataset, until all combinations are collected. This process is repeated for 6 rounds. The procedure without using case is as follows: for each combination, repetitively remove and place it on the sensor at slightly different positions each time, for 10 times. We use a similar procedure for (ii) ordering coasters. In addition, we combine both counting and ordering with the (iii) Lego blocks.

As described above, for example with reference to FIG. 5, in some circumstances single proximate objects may be distinguished with over 96% accuracy. The study described above with reference to FIG. 5 used objects with different materials and thicknesses.

In a further experiment, we attempt to recognize objects of the same material, but with varying geometry (e.g., shape), internal structure (e.g., holes) or surface properties (e.g., texture, bumps).

It is found that unmodified daily objects with varying geometry (e.g., cutlery) may be easily recognized, even though they are made from the same material. Interestingly, unmodified yet similar daily objects (e.g., credit cards from different banks, dominoes) may also be identified with very high accuracy. The high accuracy of identification of credit cards may be largely due to two factors—the coating and the embossed letters.

For a single material such as plastic or filament used in 3D printing, we explored various kinds of designs that can be altered during the manufacturing process. For example, we 3D printed pieces with i) holes ii) surface texture or bump and iii) altering the shape, as shown in FIGS. 10a to 10l. In addition, the exact same object may be minimally modified and made differentiable, for example by adding reflective material (e.g., copper tape) or by etching.

Furthermore, with the help of a thin tactile guidance layer, the location of a finger touching the surface may be identified. The tactile guidance layer may be considered to provide a numpad (numeric keypad), with different touch positions being representative of different numbers.

Identification may also work with non-flat surfaces such as a half sphere (see, for example, FIG. 10c), which may effectively turn Soli into a low-fidelity touch surface. With the touch locations being known, information regarding the touch (e.g., direction & velocity) may be extracted.

For (i) identifying 10 credit cards without a case, the procedure is similar to that described above for counting. The procedure comprises repetitively removing and placing cards for all 10 cards, for 10 rounds. For (ii) identifying different color chips, we gather 20 chips of 5 colors each, and collect data once for each chip, for both sides. For (iii) identifying users and (iv) finger touch locations, we recruited 6 participants from our school. The process took roughly 30 minutes and they were compensated with a 5 dollar voucher. We ask the participants to repetitively place their upper palm (finger area) on top of the sensor with a case but with our module removed, and data is collected for 30 times. The case used is shown in FIG. 9a.

For touch locations, we use a sheet 62 to provide tactile guidance. The sheet 62 provides 20 locations (a grid of 5 columns×4 rows). The locations are represented by apertures of the sheet 62. We collect data for 12 locations (the middle 3 columns×4 rows), each location once, and repeated the process for 10 rounds. We ask the user to place their left index finger in each position, without any limitation in their posture. We then repeat the touch experiment with a different module—a half sphere 64 with 9 locations (shown in FIG. 10c), which has no tactile landmarks but each of the 9 locations is marked with red ink. The marking with red ink provides a plurality of indicators that indicate different positions on the half sphere 64.

The orientation (for example, facing up or down) of objects can be detected. Turning an object from one orientation (for example, facing up) to an opposite orientation (for example, facing down) may be referred to as flipping. Many daily objects can be flipped and sensed. Flipping and sensing may be possible if opposite sides of an object have different surface properties (for example, material, shape, texture, etc.). Examples of objects that it may be possible to flip and sense include, for example, a smartphone, credit card, dice, mirror, sponge, magnetic eraser, book, Lego block and cutlery.

In some embodiments, flipping may enable a binary control mechanism such as turning on/off a light. Knowing the orientation of an object may also be useful for privacy and context awareness, such as setting the phone to silent mode when facing down. Flipping may afford the exploration of symmetric and asymmetric interaction techniques, where each side of an object can be associated with point and counter-point interactions.

For (i) we collect data from the rear of 10 credit cards, and combine this with data from the previous experiment (identification), to evaluate flipping. We also collect both sides of a deck of 52 playing cards. We do not evaluate flipping with other objects but we tested with success on flipping cutlery (spoon and fork) or flipping open a book.

It may be possible to distinguish different parts of the same object due to the varying internal structure of the object depending on the area being considered. The varying internal structure of the object may produce different radar responses. This knowledge may allow us to train and hence infer the location of the object relative to the sensor. With this sensing mode, an object's movement may be used to allow fluid and dynamic interactions. We have explored the possibility of using objects as continuous controls, such as sliding or rotation input. This technique may also allow us to use objects as multi-purpose dynamic input controllers. A wide range of movements (step-wise, ordered, patterned and continuous), direction, velocity, acceleration and movement force applied may be considered in the design of different forms of interaction.

Two ways to achieve sliding input are considered. For the two ways of achieving sliding input, we borrow terminology from computer vision and classify them as outside-in vs. inside-out tracking. In outside-in, we use a composite object sliding on top of the sensor, and infer the location of the object relative to the sensor, due to the radar signals signature changing when different parts of the object are being observed. In inside-out, we use the sensor itself as a probe to scan a surface, for example a desk made from compressed wood. By extending sliding to two dimensions (x and y), it may be possible to achieve 2D positioning, which may be akin to using a computer mouse with a lower resolution.

For rotation, we place a poker chip 81 on the 3D printed case 80 with an open circle in it which is shown in FIG. 9d. The poker chip 81 is placed in an open rounded aperture of the case 80. The poker chip 81 is tagged with a small piece of copper tape. The presence of the tag causes the radar signal to alter when the chip 81 is being rotated. We collect data for 12 intervals (30 degree each) twice. First we start at 0 degrees and second starting at 15 degrees. This approach allows us to explore regression to infer angular movements, for which we don't have training data. For outside-in sliding, we use a similar procedure except with a 3D printed rectangle bar, for 10 intervals at 1 cm each. A case 92 with a bar 93 is shown in FIG. 9j. For inside-out sliding, we slide the sensor along the desk surface with the same 10 intervals.

The system may support recognition of objects placed both on the sensor and from a distance. For example, the distance of a recognized object made of different materials (e.g., a mug made of plastic, glass or metal) to the sensor can be measured and may be used as a continuous one-dimensional input. A small object may be placed at a different height from the sensor with the help of a 3D printed case. Placing the small object at different heights may trigger different actions.

Each object may correspond to a different control, for example adjusting volume or playback speed. Multiple objects may also together correspond to a single control. For example, each mug may control an aspect of the color of a RGB lighting.

Holding an object at a stable distance from the sensor proved difficult, due to hand tremor and the high sensitivity of the radar with respect to tiny movements. Therefore, for experimentation we use two approaches: (i) use of a case that allows small objects to be placed (in slots) at different heights (ii) placing the sensor facing sideways on a table, so objects can be stably placed at different distances.

For (i), we slot a chip at 7 different heights and we collected 10 rounds of data. For (ii), we chose 3 objects of different materials, specifically a steel mug, a glass and a plastic bottle. We then placed each object at different distances (1 inch to 10 inches, measured by a ruler) and collected 3 rounds of data. We then attempt to classify the distance. Later, instead of distance classification, we also group all distances from the same object into the same class and simply classify them by object. We also use the range feature from the Soli SDK, but we did not evaluate its accuracy due to its black-box implementation.

Results of the various experiments described above are presented in Table 1 below:

TABLE 1

| Experiment | Test Conditions | |
|---|---|---|
| | Without case | With case |
| Count | | |
| 52 playing cards (Leave-1-out) | 99.53% | n/a |
| 52 playing cards (10-fold CV) | 99.50% | n/a |
| 20 paper sheets (RF) | 77.62% | n/a |
| 20 paper sheets (SVM) | 88.57% | n/a |
| 20 poker chips (RF) | 64.39% | 71.27% |
| 20 poker chips (SVM) | 63.12% | 80.16% |
| Order | | |
| 3 credit cards (RF) | 85.37% | 100% |
| 4 credit cards (RF) | 56.40% | 99.54% |
| 4 credit cards (SVM) | 62.05% | 99.54% |
| 3 cup coasters (RF) | 79.17% | n/a |
| 3 cup coasters (SVM) | 81.67% | n/a |
| Count + Order | | |
| 5 + 2 Lego blocks | n/a | 96.23% |
| Identify | | |
| 10 credit cards (different banks) | 87.27% | 100% |
| 7 dominoes | n/a | 99.29% |
| 5 color chips (RF) | n/a | 75.00% |
| 5 color chips (SVM) | n/a | 87.08% |
| 10 printed designs | n/a | 100% |
| 6 tagged cards | n/a | 100% |
| 12 touches on numpad | n/a | 98.59% |
| 12 touches (leave-1user-out) | n/a | 94.87% |
| 9 touches on half-sphere | n/a | 98.50% |
| 9 touches (leave-1user-out) | n/a | 95.50% |
| 6 users palm (RF) | n/a | 85.71% |
| 6 users palm (SVM) | n/a | 91.90% |
| 6 users touches (grouped by user) | n/a | 82.82% |
| Flip | | |
| 10 different cards | 83.18% | 100% |
| 52 playing cards | 97.14% | n/a |
| Movement | | |
| Rotate (classification) | n/a | 100% |
| Rotate (regression) | n/a | 99.78% |
| Slider (outside-in) | n/a | 100% |
| Slider (inside-out table) | n/a | 100% |
| Distance | | |
| Slot at 7 different heights | n/a | 100% |
| 3 mugs (10 distances) | 44.09% | n/a |
| 3 mugs (grouped) | 83.87% | n/a |

Table 1 lists the classification accuracy of different experiments on different conditions, using 10-fold cross-validation except stated otherwise, RF—Random Forest, SVM—Support Vector Machine.

The results shown in table 1 are both with and without a case. For those with very high accuracy we omitted the confusion matrix. The 3D printed case limits the degrees of freedom in object placement. In our evaluation, it was found to improve the accuracy. Of particular note are the ordering results with 4 credit card experiments which show 99.54% with the case, versus 56.40% accuracy without the case. In counting though, the difference was found to be less pronounced at approximately 7%.

Some experiments were found to work well without a case (e.g., counting and flipping playing cards), thus we decided not to repeat those studies with a case.

Some experiments were found to benefit significantly from the case. In some experiments, small but irregular shapes change the signal considerably even with tiny movements (e.g., Lego blocks, printed designs, tagged designs and rotation). In addition, a case 60 was used to hold the tactile guidance sheet 62. However, some experiments may not be practical with a case, for example due to a large surface area (e.g., counting paper sheets and ordering coasters).

We largely employ Random Forest (RF) in our real-time demo and off-line evaluation due to its speed and low memory footprint. However, a different machine learning classifier might yield better accuracy in different scenarios. For example, SVM was found to constantly outperform RF in at least some experiments. For example, the accuracy improvement may be up to 11% in counting papers and 9% in counting poker chips. In ordering and identification, the difference may be between 2% to 8% and 8% to 12%, respectively.

Our exploration demonstrates that items with a uniform shape may afford the most reliable counting. As our results show, we can count playing cards with a very high accuracy, even without using a case. This may be due to the nature of playing cards which are flat, rigid and have similar material across the entire surface. The very thin layer of color printing may not impact the signal sufficiently to confuse the recognition.

The cards may also cover the field of view of the radar well, which can be observed when the card is moved slightly and the signal remains unchanged. In contrast, sheets of paper and banknotes may be too flexible. Sheets of paper and banknotes may curl when placed on top of the sensor which may allow nonuniform air gaps to be formed between the stacked layers, Such air gaps may make counting of multiple layers less accurate. However, in some cases, counting may be possible even in the presence of air gaps. For objects which are thicker (e.g., poker chips), the accuracy was found to decrease with increasing numbers.

Figure 11A:
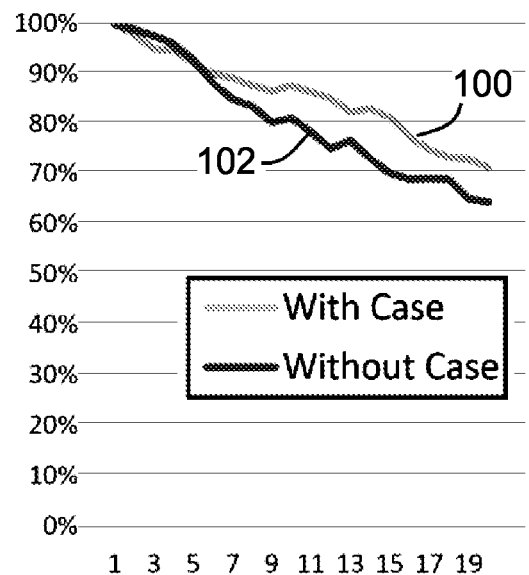
FIG. 11a is a plot of accuracy against number of poker chips, with and without using a case.

FIG. 11*a* shows accuracy versus number of chips counted. Line 100 shows results with a case. Line 110 shows results without a case. For counting 20 chips, the accuracy decreases with increasing number of chips, with and without using a case.

Figure 11B:
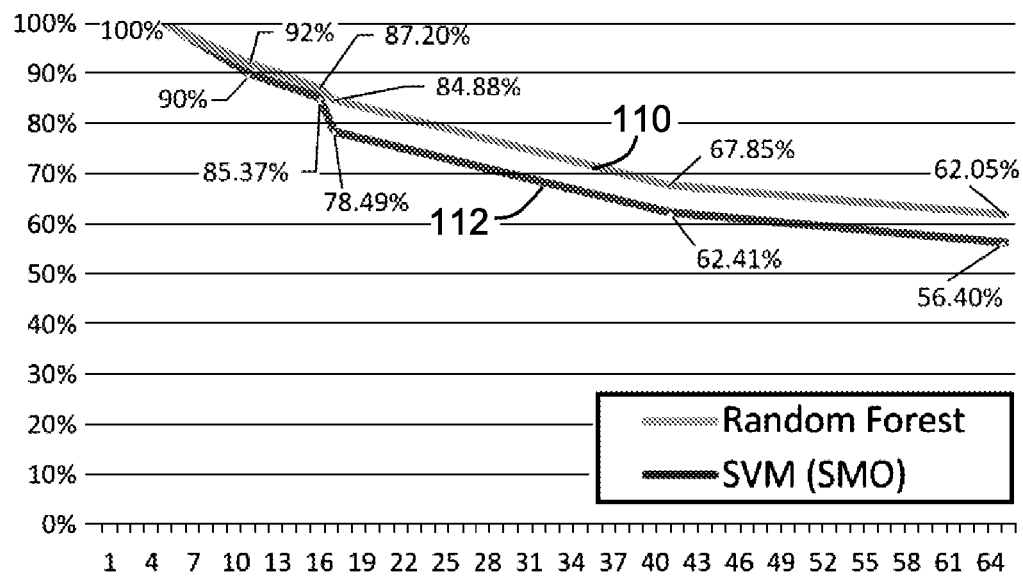
FIG. 11b is a plot of accuracy against number of permutations for ordering credit cards.

FIG. 11*b* shows accuracy versus number of permutations, for a random forest classifier (line 110) and a support vector machine classifier (line 112). For ordering 4 credit cards without a case, the accuracy decreases with increasing number of permutations. Data points are obtained at 5, 11, 16, 17, 41, 65 permutations, by removing certain cards from the dataset.

The accuracy measured when ordering 4 credit cards with a case was very high (99.54%) with only two errors. Further analysis of the data identified one of these errors as human error, due to mislabeling the data during collection of the numerous permutations explored. We also identified that certain credit cards work well for this ordering experiment but this may not be true for all cards, for example because banks may use different coatings. Some cards with metallic coatings may reflect most of the radar signals, which may make detection of multiple layers difficult.

In identifying 5 color chips, the accuracy is found to be between 75% (RF) to 87% (SVM). The relative lack of accuracy may be largely due to the uneven surface and imperfections in manufacturing, as the chips we used are low-cost product rather than casino quality.

We found that we can identify finger touch locations on flat (98.59%) and non-flat (98.50%) surfaces, even though we observed that participants use different postures (touch with a pointed, inclined finger from the top or a flat, horizontal finger). Using a leave-one-user-out evaluation (trained with n−1 participants and testing with the remaining one participant), the average results are found to be 94.87% (flat) and 95.50% (non-flat). This suggests that with enough training data, it may be possible to generalize to other users without needing to collect and train with a new user every time.

Figures 12A, 12B, 12C, 12D, 12E, 12F:
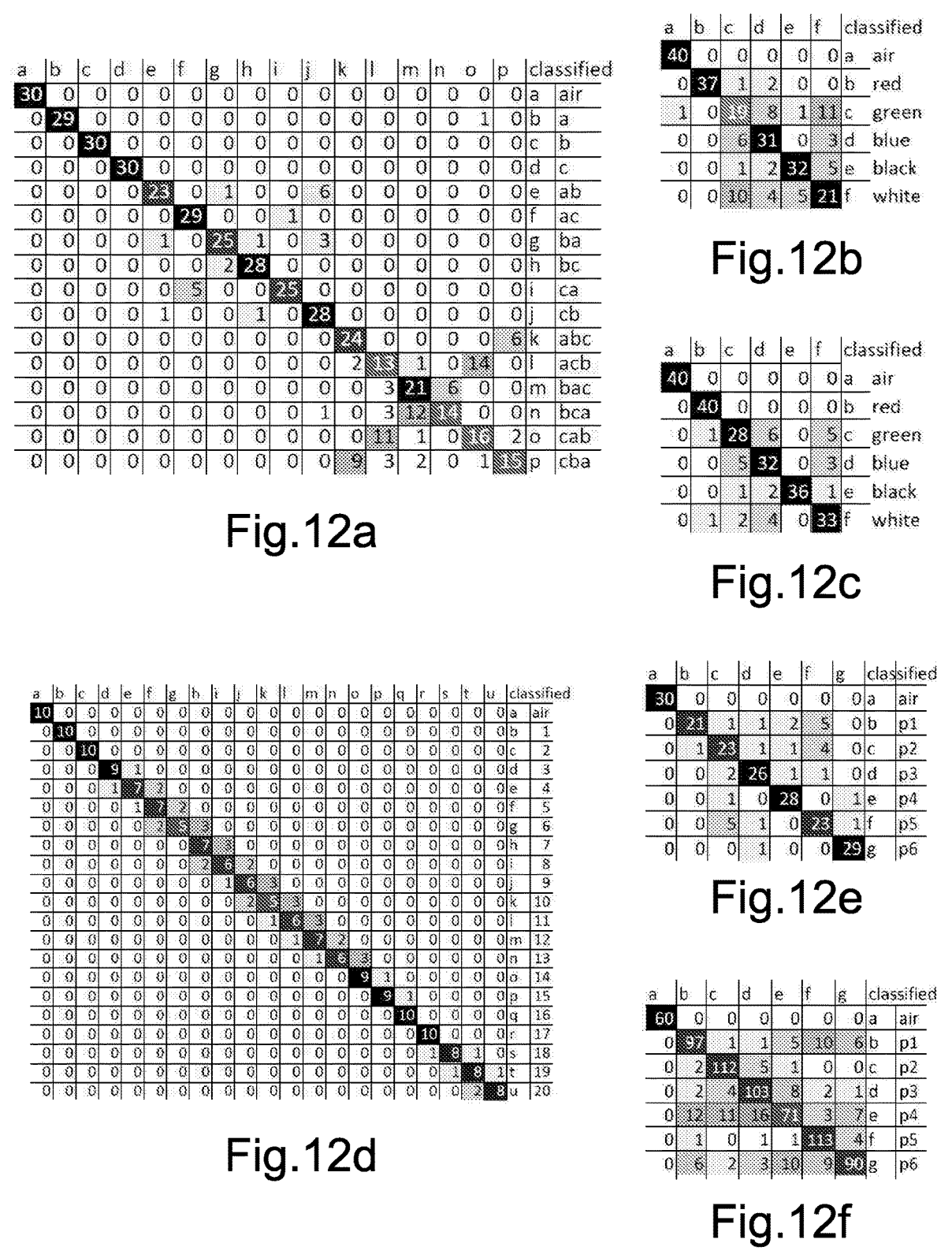

FIGS. 12*a* to 12*f* show confusion matrices for different experiments. FIG. 12*a* is a confusion matrix for ordering 3 coasters (Random Forest). FIGS. 12*b* and 12*c* are confusion matrices for counting 5×20 color chips (FIG. 12*b*: Random Forest, FIG. 12*c*: Support Vector Machine). FIG. 12*d* is a confusion matrix for counting 20 papers (Random Forest). FIGS. 12*e* and 12*f* are confusion matrices for identifying users (FIG. 12*e*: by palm, FIG. 12*f*: by touch behavior).

We found that we could also identify different participants by their upper palm with rather promising accuracy, from 85.71% (RF) to 91.90% (SVM), where the confusion matrix is shown in FIG. 12*b* and FIG. 12*c*. FIGS. 12*b* and 12*c* show the confusion matrices for counting 5×20 colour chips, where the results of FIG. 12*b* were obtained using RF and the results of FIG. 12*c* were obtained using SVM. However, the palm data (30 rounds) is collected within the same session, although we do ask participants to pause and stand up after 10 rounds. As such, it's worth highlighting that the recognition may not generalize over time. Most surprisingly, we also found that by grouping all the touches by participant (ignoring location), it was possible to differentiate the user with rather good accuracy (82.82%) where the confusion matrix is shown in FIG. 10*f*. FIG. 10*f* is a confusion matrix for identification of users by touch behaviour. We suggest that it may be possible to identify users because users have different touch behavior when using a numpad, and these may be extracted for additional input during an authentication process (2 factors authentication). P4 had the lowest precision, which may potentially be because she wore a ring.

In flipping credit cards, the accuracy was found to increase from 79% to 100% when the case is being used. The change in accuracy may be because the radar signal reflected by credit card may vary depends on the spot being observed, due to uneven surface, chip and coating. In the 10 rounds of data collection without case, the card was being randomly placed at a slightly different position each time, which may explain the lower accuracy. When using a case, this issue may be expected to have virtually gone. In contrast, flipping playing cards was found to be very accurate (97.14%) even without using a case, which may be because of the similar signal response on any location, as explained above.

In classifying movement (rotation and sliding), we found that we achieves 100% accuracy with our 10 rounds of data collected using 10-fold cross-validation. We also evaluate rotation by using regression, achieving a high correlation coefficient of 0.9978 with a mean absolute error of 0.15 and RMS error of 0.27. We also collected a new set of data at half intervals and used it as a test set (not trained) for regression to estimate these values. In this case, the correlation coefficient was lower at 0.9327 with a mean absolute error of 1.02 and RMS error of 1.35. However, we found that only a single position constantly gave a very high error (M=3.7). By removing this outlier position from the result, the mean absolute error decreases to 0.77 and RMS error to 0.85. Therefore, it was found to be possible for Solinteraction to infer values at positions that have not been previously trained.

For distance with our slotting scheme, we found that we were able to recognize the height of the object being slotted very accurately, albeit limited to fixed intervals and a single type of object. We extended it to multiple types of objects (3 mugs with varying materials) and larger distances (from 1 to 10 inches away) but then the recognition rate was only 44.09%. We then discarded the distance information and grouped the observations into material only, and the accuracy increased to 83.87%. Therefore, we decided to employ the range feature provided in the Soli SDK.

Since radar is not a vision sensor, and we are only using the raw signal without high levels of abstraction and processing, we do not expect to be able to reconstruct the exact shape of the object from a distance. However, we may be able to tell the material of the object, based on overall reflected signal response.

Solinteraction may provide a family of techniques for designers to explore new designs in tangible interaction. Single or multiple techniques may be coupled and combined to realize new forms of dynamic geometries of interaction with day-to-day objects. This library of sensing techniques may be formulated into a design space, from which we can explore various forms of interaction. Here we detail five dimensions from expressive interaction to context to describe this design space of radar based interaction, along with illustrative examples.

Solinteraction may be used for expressive tangible interaction. Tangible interaction may not be limited to single tokens. Multiple tokens may be stacked in different ways to enable more expressive input. For example, 3 tokens will allow 15 combinations whereas increasing to 4 tokens increases the combinations to 64.

Solinteraction may be used to fluidly interleave static and dynamic interaction. An object may be recognized when placed statically on the sensor or touched by the sensor as if using a probe. In addition, the object may be moved and continuously tracked. This means a single object may serve as a site for static and dynamic interaction for multi-purpose input control.

Solinteraction may be used for mixed-mode tangible and gesture interaction. When there is no object or only a thin layer is placed on top of the sensor, the mid-air gesture sensing (the original purpose of Google's Soli) may continue to function, which may allow mixed-mode interaction. Combining both types of input modalities may greatly expand the possible interaction A single, generic sensor may support multiple purposes.

Solinteraction may be used for subtle and/or deceptive interaction. As radar signals can penetrate through material such as clothing, interaction with devices may be very subtle or even hidden from plain sight. For example, interaction may take place when the device is covered by cloth or hidden inside a box. Users may then employ nearby physical objects that may be disguised as tangible tokens for interaction.

Solinteraction may be used to facilitate contextual commands. Instead of using the sensor solely for recognizing a token that is placed on top of the sensor, the sensor may be placed downward to sense the current surface, and then enable the phone to switch its context automatically. For example, if the sensor determines that a phone is placed on kitchen table, the phone may show most relevant apps. Thus, any surface may now become a canvas for exploration.

Solinteraction may offer designers the creative freedom to design many forms of tangible interaction. Here we describe a range of application scenarios which may help designers understand the relative merits of the techniques proposed. To achieve this, we populate the identified design space with three speculative example scenarios where we might expect this kind of sensing to be commonplace in the future. We then create two example applications which couple and combine our basic mechanisms into a single blended interaction.

The ability to sense everyday objects, from a tiny device, combined with interaction may allow for numerous interaction zones around such sensing surfaces. Consider, for example, the ability to sense Lego blocks (with different sizes, thickness and shapes) as one is interacting with them in hand. This may open up considerable potential for interaction, in part due to how common Lego is and the exponential growing combinations in how Lego blocks can be combined.

We may also imagine this kind of sensing is woven into material and fabric that people are wearing. This allows us to consider two contexts of use for Solinteraction, firstly where the sensing is built into surfaces and second where the sensing is carried with a person in their wearable and personal devices. As such, the concept of interaction zones may now extend to an area around wearable or personal devices.

As a result, we may have context-aware interactions where devices or hands are placed on different surfaces (working desk, kitchen table). A different interaction zone tailored personally to this context may be used. Such a zone may also supports the original mid-air gestures which the Soli was intended for, when the Soli sensor is not covered.

We might first consider a social setting where using digital devices in front of other people can often appear to be rude. People sometimes politely turn their phone upside down on the table to show respect, yet they still want to interact with it in subtle and minimal ways. Users may then use nearby physical objects (e.g., fork, spoon, wine glass) that disguise as tangible tokens for interaction, to control simple tasks (voice recording, start audio recorder) or to obtain desired information about the number of messages and their urgency, all without touching the screen. Instead of turning the phone over, to touch the screen, the user may subtly place tokens on the phone and feel certain types of feedback such as a haptic output to indicate the numbers of messages.

This setting may be tailored to specific retail or dining scenarios. For example, a restaurant may presents a range of opportunities for new forms of digital-physical interaction. In many restaurants, typically fast food and sushi restaurants, the plates are color coded to represent the price tag. Similarly, in one embodiment, different plates are tagged and if the user wants to order more food of this type, they just place this token on the sensor or on the back of the phone, and the order will be processed automatically. Placing a menu face down might call for a waiter while a specific drink coaster might be tied to a cocktail, wine or beer. Moving a bottle to the edge of the table might indicate more wine. While stacking a set of sushi plates might indicate the customer is leaving and trigger a bill. Ordering credit cards may allow a group of friends to split the bill un-evenly, where the bottom card pays for a bigger portion.

We can also consider our system being used in professional board or card game environments, where the sensing is embedded beneath the table. This may enable the counting of cards/chips or recognizing the player's turn, or automatically updating the game without player or dealer intervention. Since card flipping may also be recognized, this may allow a very seamless experience. Players may take turns by placing their hand on the sensor and being authenticated. Players may also touch/knock/swipe on the sensor which are common casino gestures.

Such interaction may also enable education and learning applications to be more engaging and fun for children. For example, in a simple mathematics application, children could be required to place the correct amount of objects or cards to solve a question. Different objects may be used to represent mathematics symbols such as addition, subtraction, multiplication or division.

Because face to face interaction allows people to maintain eye contact, remote collaborations may also greatly benefit from Solinteration. For example, consider the case of fashion or flooring designers handling and manipulating materials for a remote customer. Their material interactions may be recognized, displayed and made part of the space automatically.

Finally, smart work and home environments may offer a wide range of opportunities for Solinteraction. The placement and combination of ornaments within a home may control lighting, heating and/or the audio setup. Physical items may be linked to audio, video and multimedia items or presentations. For example, a jukebox may be created based on slotting discs.

Soli is a solid-state radar chip which is cheap and small when mass produced. As such, it may be embedded in everyday devices, which may allow such devices to become ubiquitous sites for sensing. Further development of such sensors with higher bandwidth or at different frequencies (e.g., Terahertz), which can penetrate through material and have different reflectance properties may mean more powerful sensing modes can be achieved. We suggest that with deep learning approaches, the system may scale to an even wider range of daily objects, thus extending the potential of this form of interaction even further. Here we envision several future applications.

Biometric—user authentication: To differentiate and authenticate users by their hands, much like blood vein recognition, may be feasible. We have shown that it is possible to use Soli to recognize different users just by touching the upper palm, but the accuracy is limited. At 60 GHz, the radar signal may only be able to penetrate the skin to about 1 mm.

Further, we demonstrated the ability to differentiate users based on how the users touch a numpad. This may enable on-the-fly authentication when users are requested to press a few digits, by judging how they touch. Such biometric measures may be useful additional input when combined with other means of biometric authentication.

Food and drinks: We have conducted a preliminary study to differentiate i) liquids with different dye and contamination and ii) various kind of foods under highly controlled environments and the results are promising. In the future, we envision that the nutrition level inside the foods or drinks may also be measured. Recognizing ingredients along with the nutrition and freshness might enable a truly smart kitchen.

Smart shoe: When embedded in a shoe, it may be possible to know one's current location in a building (location awareness) based on the tiles or carpet being stepped on. It may perhaps replace the tactile paving on the road that is used for assisting the blind with something that is embedded beneath the ground.

Bookmark: We may detect whether a book is flipped open, count the number of pages being flipped and save the bookmark automatically or display different content on different pages with the companion app running on a phone.

These future applications are intended to show the potential of Solinteraction when such sensing may become ubiquitous. Passive objects and hence object interaction may then form part of our thinking about new computational experiences.

Solinteraction may allow users to use everyday objects as tangible tokens. We have shown that many day-to-day objects may be recognized, with or without tagging.

Further, as radar signals penetrate through certain materials, we may achieve counting and ordering with high accuracy and for many layers.

Thanks to the high sensitivity of the radar sensor, we can in some circumstances detect subtle differences between object and layers. However, this high sensitivity may also present challenges. For an object to be recognized in a stable manner, it may have to be placed directly on top of the sensor, which may limit the field of view of the sensor.

Other dimensions (for example, air gap, bending, position, height) may also contribute to the overall recognition accuracy. As shown in the counting paper experiment, there may be some confusion with increasing layers. The confusion may be between neighbours.

Confusion may occur because the sheets of paper are very thin and flexible. In contrast, counting the full set of playing cards (up to 52) was found to perform very accurately. In the flipping playing card experiment, we realized that when we intentionally bend the card, the classified class may temporarily be inverted. However, it was found to return to the correct class after a short time, which may be due to the flexibility of the card (as long the card is not bent to an extent it cannot return to its original shape).

While we have demonstrated that we can recognize and interact with objects from a distance, the method is currently found to be most robust with objects placed directly on top of the sensor. Signal propagation level decreases with increasing layers. In the chips counting experiment (for which results are shown in FIGS. 11a and 11b), the accuracy drops with increasing number of chips. In some circumstances, it may be preferable to limit the number of stacking layers until future versions of the radar hardware with stronger antenna signal strength and signal-to-noise ratio. Currently it is found to accurately count a set of playing cards (52), which may be enough to explore many casual interactions in board games.

Our system was found to works well without a case. However, with a case it may be possible to extend the functionality and sensing accuracy. As the sensor we used (Soli) employs a broad beam of 150 degrees, a small object (e.g., a Lego piece) does not cover the entire field. At such a short distance (6 mm from antenna to case), even a tiny movement may greatly alter the raw signal. Therefore, the case may serve as a simple mechanism to fix the object in place, reducing the degree of freedom of the data required to compensate for tiny changes in location and orientation.

While using a case might in some circumstances reduce the practicality of the system, it is not uncommon for sensing systems to have a case or holder. For example, a card reader often requires the card to be fully slotted in, or swiped through the magnetic reader; or money counting machines requires bank notes to be placed exactly within the mechanical guide, etc.

As a proof-of-concept prototype, the current training process requires considerable effort to collect the data. However, for a commercial product, it may be factory trained and calibrated before shipping to end-users because the sensing modes (counting, ordering, etc.) may not vary with users. For touch location sensing (numpad), we also see that it may be generalized to other users when only trained with a group of users.

It may also be possible to reduce the training effort by using interpolation or regression. As we have shown, regression may work for a slider and rotating dial when data is collected at small to medium intervals. One exception was the table sensing example, where regression was found to fail even when trained with data collected at a very small interval. The table is made of compressed wood and as such, there is no linearity of the signal change between different locations.

Other means of reducing training effort may be seen as automation. For example in the hourglass, the data collection may be synced with computer timer, which may be only a one click process. By pairing the system with a device which contains an inertial measurement unit (IMU), such as a phone, ground truth orientation may be provided for real-time training. Furthermore, training might be automated with the help of mechanical device such as using a robotic hand or paper dispenser.

We have explored several facets of radar-based tangible interaction. Reflecting on our design space and application scenarios, we show that radar sensing may be useful as a new means to interact with computation using everyday objects, which may not be limited to static interaction only.

The potential of radar sensing in HCI has been demonstrated in detecting micro hand gestures and recognizing objects. Other facets of radar may previously have been under-explored in the context of HCI, especially in tangible interaction.

We have proposed using radar as a generic sensing platform for sensing and tracking the identity of an object or number of objects in proximity, spatial information (location in space, distance from sensor, direction of movements), temporal data (time, speed, frequency of interactions) and activity (flipping, ordering) with unmodified objects as shown in FIG. 1.

We have achieved this by repurposing the Google Soli sensor and by analyzing its raw radar signals. We have also shown that by adding a case with swappable module, we may expand the interaction capabilities and improve the object sensing accuracy. We may then utilize these capabilities to explore the design space of tangible input and interaction. We name this family of techniques Solinteraction. We have explored radar-based sensing for tangible interaction and extending it to support various sensing modes. With a simple add-on module of various designs, we may further extend the capabilities and accuracy.

We have evaluated the robustness and accuracy of the family of techniques, with a focus on counting and ordering a stack. We have also opened the raw dataset for others to draw upon.

We have demonstrated the potential through creating applications with rich, tangible interactive functionality. We have also suggested scenarios that can be enabled with our techniques.

Methods demonstrated above may be implemented in a variety of fields, for example in various fields in the consumer market. Methods demonstrated above may be used in board games (for example, cards or poker) or in interactive toys (for example, Lego). Methods demonstrated above may be used in internet-of-things devices. Methods demonstrated above may be used in smarthome products.

We have proposed the use of radar as a generic sensing platform for tangible input and interaction. In Solinteraction, we have explored the design space and practical use-cases for such interaction, using everyday objects that are commonly found in daily life. Our exploration has allowed us to identify a series of design patterns, beyond simple static interaction. This may support continuous and dynamic interaction, such as counting the number of objects or using an object as a sliding or rotating input mechanism. This exploration is grounded in rigorous experiments, showing that such sensing may be accurate with minimal training. With these techniques, we envision both realistic and future applications and scenarios. Solinteraction may open up the potential of radar-based tangible interaction for the HCI community to build upon.

Whilst components of the embodiments described herein have been implemented in software, it will be understood that any such components can be implemented in hardware, for example in the form of ASICs or FPGAs, or in a combination of hardware and software. Similarly, some or all of the hardware components of embodiments described herein may be implemented in software or in a suitable combination of software and hardware.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the invention.

The invention claimed is:

1. A classification method comprising:
positioning an inanimate object and a radar unit in proximity to each other such that a distance between the inanimate object and the radar unit is less than 1 m;
receiving by the radar unit raw radar signals reflected from a field of view of the radar unit, whereby the field of view includes the inanimate object; and
performing a classifying to identify the inanimate object, wherein
the inanimate object is an inanimate solid object or a liquid;
the classifying is based on the at least one feature extracted from the raw radar signals, and
the classifying comprises using a machine learning classifier to distinguish between objects or classes of objects from a predetermined list of objects or classes of objects having at least one of different materials, different internal structure, or a different number of stacked objects;
and the classifying of the inanimate object comprises identifying the inanimate object as being a selected object or in a selected class of objects or having a selected number of objects, the selected object, class or number being from the predetermined list of objects or classes of objects having the at least one of different materials, different internal structures, or different number of stacked objects, wherein
the method further comprises transmitting by the radar unit a frequency-swept signal;
the receiving of the raw radar signals is performed using a plurality of receivers and is in response to the frequency-swept signal, each receiver at a different position, and the raw radar signals comprise a plurality of channels each corresponding to a field of view of a respective one of the receivers,
the method further comprises dividing each raw radar signal into a plurality of time bins, such that each time bin corresponds to a respective frequency value or range, and using an amplitude of the raw radar signals for each timeline and channel as a respective feature, thereby to obtain a set of time-binned features from the raw radar signals; and the classifying is performed by applying the machine learning classifier to the time-binned features obtained from the raw radar signals for the fields of view of the plurality of receivers.

2. A classification method according to claim 1, wherein the classification data comprises probability data.

3. A method according to claim 1, wherein the radar unit comprises or forms part of at least one of: a mobile device, a mobile phone, a smart watch or a wearable unit.

4. A method according to claim 1, wherein at least one of:
a) the method comprises determining based on the classification data an operating mode of a computer program or device;
b) the method comprises determining based on the classification data at least one of an input to a computer program or device, or a command;
c) the classification data comprises a movement of the inanimate object, and the moving object is used as an input device;
d) a sliding object is used as a sliding control, or a rotating object is used as a rotating control.

5. A method according to claim 1, wherein the inanimate object comprises a plurality of objects and at least one of:
a) the method comprises stacking the plurality of objects;
b) the classifying comprises counting and/or determining an order of the plurality of objects;
c) the method comprises stacking the plurality of objects on the radar unit or on an associated measurement platform;
d) the method comprises stacking the plurality of objects and the stacking is such that radar is reflected from each of the plurality of objects along a common axis.

6. A method according to claim 1, wherein the inanimate object comprises a plurality of objects and at least one of:
a) the plurality of objects comprises a plurality of objects of the same type or category of object;
b) the plurality of objects comprises a plurality of sheets of paper, a plurality of pages of a book, a plurality of playing cards;
c) the plurality of objects comprises a plurality of banknotes;
d) the classifying comprises determining an order of the plurality of objects.

7. A method according to claim 1, wherein the positioning of the inanimate object and the radar unit in proximity to each other comprises positioning the radar unit in proximity to one of a predetermined set of objects, wherein each object of the predetermined set of objects corresponds to a different operating mode of a computer program.

8. A method according to claim 1, wherein at least some of the objects or classes of objects of the predetermined list also have different shapes, different sizes, different surface properties or different thicknesses.

9. A method according to claim 1, comprising at least one of:
a) determining based on the classification data a location of the radar unit;
b) determining based on the classification data an orientation of the radar unit.

10. A method according to claim 1, wherein at least one of:
a) the radar unit comprises or forms part of a mobile phone and the method comprises determining an operating mode for the mobile phone in dependence on the classification data;
b) the method comprises switching a mobile phone into silent mode or into loudspeaker mode depending on its location determined based on the classification data.

11. A method according to claim 1, wherein at least one of:
a) the object classification comprises classification of objects by at least one of material; shape; color; orientation; position; distance;
b) positioning the inanimate object and the radar unit in proximity to each other comprises positioning the inanimate object in a measurement region associated with the radar unit;
c) positioning the inanimate object and the radar unit in proximity to each other comprises positioning the inanimate object at a distance from the radar unit that is less than 100 mm, further optionally less than 50 mm, further optionally less than 20 mm;
d) positioning the inanimate object and the radar unit in proximity to each other comprises positioning the inanimate object in physical contact with the radar unit and/or in physical contact with a housing or surface that forms part of or is associated with the radar unit.

12. A method according to claim 1, wherein at least one of:
a) the radar unit comprises or is associated with a measurement platform;
b) the radar unit comprises or is associated with a measurement platform and the measurement platform comprises a guide that is configured to indicate a plurality of positions for the inanimate object.

13. A method according to claim 1, wherein at least one of:
a) the radar unit comprises at least one transmitter configured to transmit radar signals, and the transmitted radar signals comprise frequency modulated continuous wave (FMCW) signals or the transmitted radar signals transmitted comprise at least one frequency sweep;
b) the radar unit comprises at least one receiver configured to receive the radar signals reflected from the inanimate object;
c) the radar signals comprise signals having wavelengths between 1 GHz and 100 GHz, optionally between 40 GHz and 80 GHz, further optionally between 50 Hz and 70 GHz, further optionally the radar signals comprise signals in a 57 GHz to 64 GHz band.

14. A method according to claim 1, wherein at least one of:
a) the procedure for classifying is configured to determine a position of the inanimate object relative to the radar unit;
b) the procedure for classifying is configured to determine a change in the position of the inanimate object over time.

15. A method according to claim 1, wherein the procedure for classifying is configured to at least one of:
a) distinguish between an object in a first orientation and that object in a second orientation; and/or
b) distinguish between a predetermined list of objects or classes of objects.

16. A method according to claim 1, wherein at least one of:
a) the method comprises displaying at least some of the classification data;
b) the different objects and/or classes of objects comprise objects having at least one of: different materials, different sizes, different thicknesses, different geometry, different colors, different orientations, different surface textures and/or different internal structure;
c) the method comprises providing to a user information about the inanimate object based on the classification data;
d) the method comprises providing to a user information about the inanimate object based on the classification data and the information comprises at least one of: a name of the inanimate object, dictionary data, foreign language data, a technical specification, an identity of the inanimate object, information about at least one material or component of the inanimate object.

17. A method according to claim 1, wherein at least one of:
a) the classification data comprises an identification of a liquid;
b) the different objects and/or classes of objects comprise receptacles having different fill levels;
c) the procedure for classifying is trained to distinguish between different fill levels.

18. A method according to claim 1, wherein at least one of:
a) the radar unit forms part of an appliance;
b) the radar unit forms part of a fridge, washing machine, dryer, cooker, oven, microwave oven, grill, blender, or food processor;
c) the classifying of the inanimate object comprises classifying the inanimate object as a type of food or drink, and/or wherein the inanimate object comprises a receptacle placed in an appliance.

19. A method according to claim 1, wherein at least one of:
a) the classification data comprises fill level data;
b) the method further comprises providing a notification to a user concerning fill level based on the classification data;
c) the method further comprises providing a notification when a fill level is below a threshold level and/or the fill level is empty and/or the fill level is above a threshold level and/or the fill level is full;
d) the method comprises performing an action based on the classification data.

20. A method according to claim 1, wherein at least one of:
a) the classes of object comprise types of waste and/or wherein the method is used to separate different materials for recycling;
b) the radar unit is embedded in clothing or footwear;
c) the radar unit comprises or forms part of a digital medical device;
d) the radar unit is embedded in a surface and the procedure for classifying is used to classify objects placed on that surface;
e) the radar unit is embedded in a glove and the procedure for classifying is used to classify objects held using the glove.

21. A method for training a procedure for classifying objects or classes of objects, the method comprising:
obtaining training data for each of a plurality of different inanimate objects or classes of inanimate objects, wherein the training data for each inanimate object or class of inanimate objects comprises:
radar signals reflected from a field of view of a radar unit for receiving raw radar signals, whereby the field of view includes the inanimate object or inanimate objects in the class of inanimate objects, or at least one feature extracted from the raw radar signals; and
training a procedure for classifying on the training data, wherein the procedure is trained to distinguish between objects or classes of objects from a predetermined list of objects or classes of objects having at least one of different materials, different internal structure, or a different number of stacked objects based on radar signals reflected by an inanimate object at a distance of less than 1 m,
wherein the inanimate object is an inanimate solid object or a liquid, and wherein the method further comprises:
transmitting by the radar unit a frequency-swept signal;
the receiving the raw radar signals by the radar unit performed using a plurality of receivers and is in response to the frequency-swept signal, each receiver at a different position, and the raw radar signals comprise a plurality of channels each corresponding to a field of view of a respective one of the receivers,
dividing each raw radar signal into a plurality of time bins, such that each time bin corresponds to a respective frequency value or range, and using an amplitude of the raw radar signals for each timeline and channel as a respective feature, thereby to obtain a set of time-binned features from the raw radar signals; and
the classifying is performed by applying the machine learning classifier to the time-binned features obtained from the raw radar signals for the fields of view of the plurality of receivers.

22. An apparatus for classification of objects, the apparatus comprising
a radar unit configured to receive raw radar signals reflected from a field of view of the radar unit, whereby the field of view includes an inanimate object positioned in proximity to the radar unit such that a distance between the inanimate object and the radar unit is less than 1 m, and
a processor configured to classify and thereby identify the inanimate object based on at least one feature extracted from the raw radar signals, wherein
the processor is configured to classify by the inanimate object to determine a classification of the inanimate object by using a machine learning classifier to distinguish between objects or classes of objects from a predetermined list of objects or class of objects having at least one of different materials, different internal structure, or a different number of stacked objects, and the inanimate object is an inanimate solid object or a liquid,
the processor is further configured to use the classification of the inanimate object to identify the inanimate object as being a selected object or in a selected class of objects or having a selected number of objects, the selected object, class or number being from the predetermined list of objects or classes of objects having the at least one of different materials, different internal structures, or different number of stacked objects, wherein
the radar unit is further configured to transmit a frequency-swept signal;
in response to the frequency-swept signal, the radar unit is further configured to receive the raw radar signals using a plurality of receivers, each of the plurality of receivers at a different position, and the raw radar signals comprise a plurality of channels each corresponding to afield of view of a respective one of the receivers, the radar unit is further configured to divide each raw radar signal into a plurality of time bins, such that each time bin corresponds to a respective frequency value or range, and use an amplitude of the raw radar signals for each time bin and channel as a respective feature, thereby to obtain a set of time-binned features from the raw radar signals; and the processor is further configured to apply the machine learning classifier to the time-binned features obtained from the raw radar signals for the fields of view of the plurality of receivers.

23. A tangible, non-transitory computer readable medium storing computer readable instructions that are executable by a processor to perform a method including the steps of claim 1.

\* \* \* \* \*